(12) United States Patent
Waldo et al.

(10) Patent No.: US 8,290,965 B2
(45) Date of Patent: Oct. 16, 2012

(54) APPARATUS AND METHOD FOR THE AUTOMATIC DISCOVERY OF CONTROL EVENTS FROM THE PUBLICATION OF DOCUMENTS

(75) Inventors: Patrick Blackmon Waldo, Bethesda, MD (US); Andrew B. Waldo, Bethesda, MD (US)

(73) Assignee: Decernis, LLC, Washington, DC (US)

( * ) Notice: Subject to any disclaimer, the term of this patent is extended or adjusted under 35 U.S.C. 154(b) by 0 days.

(21) Appl. No.: 13/159,537

(22) Filed: Jun. 14, 2011

(65) Prior Publication Data

US 2011/0302171 A1 Dec. 8, 2011

Related U.S. Application Data

(63) Continuation-in-part of application No. 12/632,951, filed on Dec. 8, 2009.

(51) Int. Cl.
*G06F 7/00* (2006.01)
*G06F 17/30* (2006.01)
*G06Q 40/00* (2012.01)
*G10L 15/06* (2006.01)

(52) U.S. Cl. . 707/751; 707/740; 707/749; 707/999.107; 705/40; 704/243

(58) Field of Classification Search ............ 707/740, 707/749, 751, 999.107; 705/40; 704/235, 704/243

See application file for complete search history.

(56) References Cited

U.S. PATENT DOCUMENTS

| | | | |
|---|---|---|---|
| 7,395,243 B1 * | 7/2008 | Zielke et al. | 705/40 |
| 7,542,991 B2 * | 6/2009 | Ouzounian | 707/104.1 |
| 7,805,299 B2 * | 9/2010 | Coifman | 704/235 |
| 8,073,773 B2 * | 12/2011 | Kozee et al. | 705/40 |
| 2002/0156810 A1 | 10/2002 | Holland et al. | |
| 2005/0165743 A1 | 7/2005 | Bharat et al. | |
| 2006/0247944 A1 | 11/2006 | Calusinski, Jr. et al. | |
| 2007/0150513 A1 | 6/2007 | Vanden Heuvel et al. | |

OTHER PUBLICATIONS

Form PCT/ISA/237 (four (4) pages).

* cited by examiner

*Primary Examiner* — Charles Kim
*Assistant Examiner* — Cheryl M Shechtman
(74) *Attorney, Agent, or Firm* — Crowell & Moring LLP

(57) ABSTRACT

A method and system for discovering a control event from electronically published documents and received data streams is provided, in which a computer control program identifies electronically published documents and data stored in a plurality of network servers which potentially contain control events relevant to the control of goods and/or services, the control events identified by reference to user interest identifiers. Identified material is analyzed by a classification program to determine whether control events are present. A control event classification is assigned to documents and received data determined to contain at least one discovered control event, the assigned control event classification and information identifying the associated document and data is stored in a classification database, and a report of discovery of documents and data containing control events is to be provided to a user. The report may include a link to the control event classification and/or its associated document or data.

22 Claims, 28 Drawing Sheets

| | Home | Product Safety | Food and Consumer Products | Decernis News | | | | | |
|---|---|---|---|---|---|---|---|---|---|
| Search | | | | | | | Search s | | |
| Search Site 🔍 | | | | | | | | | |
| Advanced Search | Publication Date | Region | Country | Agency | Type | Citation | Journal Source | Module | Topic | Subtopic | Details |
| Navigation | 2008/11/28 | NA | United States | Environmental Protection Agency | PROPOSED RULES | Protection of Stratospheric Ozone: the 2009 Critical Use Exemption from the Phase-out of Methyl Bromide. 72421 – 72440 [E8 – 28328] | Federal Register | Product Safety | Environmental | Air | Details |
| ☐ North America | 2008/11/25 | European Union | European Union | European Chemicals Agency | Registry | Registry of intentions for Annex XV dossiers | European Chemicals Agency | Product Safety | Dangerous Toxic Substances | REACH | Details |
| ☐ European Union | | | European Union | European Commission | Regulation | Regulation (EC) No 1102/2008 of the European Parliament and the Council of 22 October 2008 on the banning of exports of metallic mercury and certain mercury compounds and mixtures and the safe storage of metallic mercury (1) | EurLex | Product Safety | Dangerous Toxic Substances | Controls | Details |
| ☐ Latin America | 2008/11/14 | European Union | European Union | European Commission | Act | Council Joint Action 2008/658/CFSP of 10 November 2008 in support of the Biological and Toxin Weapons Convention (BTWC), in the framework of the implementation of the EU Strategy against the Proliferation of Weapons of Mass Destruction | EurLex | Product Safety | Import and | Chemical Weapons | Details |
| ☐ Asia Pacific | 2008/11/13 | European Union | European Union | | | National Emission Standards | | | | | |

FIG. 3

| Home | Product Safety | Food and Consumer Products | Decernis News |

Search s

Registry of intentions for Annex XV dossiers

| Publication Date | Region | Country | Agency | Type | Citation | Journal Source | Module | Topic | Subtopic |
|---|---|---|---|---|---|---|---|---|---|
| Nov 25, 2008 12:00 AM | European Union | European Union | European Chemicals Agency | Registry | Registry of intentions for Annex XV dossiers | European Chemicals Agency | Product Safety | Dangerous - Toxic | REACH |

Search
- Search Site
- Advanced Search

Navigation
- North America
- European Union
  - European Commission
  - European Food Safety Authority
  - European Chemical Agency
    - registry-of intentions
- Latin America
- Asia Pacific Substances found:

| Chemical | CAS | Pages |
|---|---|---|
| Pyrene | 129-00-0 | 1 |
| Phosphate | 14265-44-2 | 1 |
| Abamectine | 65195-55-3 | 1 |
| Tris (nonylphenyl) phosphate | 26523-78-4 | 1 |
| Distillates, coal tar | 65996-92-1 | 1 |
| Trixylyl phosphate | 25155-23-1 | 1 |
| Coal tar pitch | 65996-93-2 | 1 |
| Chloroform | 67-66-3 | 1 |
| Clothianidin | | |
| Mercaptoacetate | 68-11-1 | 1 |
| Indium phosphide | 22398-8—7 | 1 |
| Di-tert-butyl peroxide | 110-05-4 | 1 |

ECHA

European Chemicals Agency      English      Legal notice | Contact

- HOME
- PRE-REGISTRATION
- REACH
- CONSULTATIONS
- ECHA CHEM
  - Registry of intentions
  - Pre-Registered Substances
  - Candidate List
- REACH-IT
- CLASSIFICATION
- PRESS AND EVENTS
- ABOUT ECHA
- PUBLICATIONS
- WORKING WITH US
- APPEALS

Registry of intentions for Annex XV dossiers

- Annex XV dossiers submitted
- Withdrawn intentions

| Dossier intended by | Substance identification and composition | | | Impurities (where relevant for harmonize C&L, SV or restriction) | | | Types of Annex XV dossier | Date of intention | Expected submi |
|---|---|---|---|---|---|---|---|---|---|
| | IUPAC name (and/or chemical name) | EC number (and/or CAS number) | Purity range | IUPAC name (and/or chemical name) | EC number (and/or CAS number) | Concentration range | | | |
| Current intentions | | | | | | | | | |
| Netherlands | abamectine | (71751-41-2) | | | | | CL | 07/08/2008 | 30/11/2008 |
| Netherlands | acequinocyl | (57960-19-7) | | | | | CL | 07/08/2008 | 31/12/2008 |
| Netherlands | trixylylphosphate | 246-677-8 | | | | | CL | 07/08/2008 | 30/09/2008 |
| COM | Distillates (coal tar), pitch distn. residues (coal tar), heavy oils, pyrene fraction | 295-507-9 | | | | | SVHC | 27/06/2008 | 01/12/2008 |
| COM | Distillates (coal tar), heavy oils, pyrene fraction | 292-607-4 | | | | | SVHC | 27/06/2008 | 01/12/2008 |
| COM | Distillates (coal tar), pitch, pyrene fraction | 295-304-5 | | | | | SVHC | 27/06/2008 | 01/12/2008 |
| COM | | 295-313-4 | | | | | SVHC | 27/06/2008 | 01/12/2008 |
| COM | coal tar pitch, high temperature | 266-028-2 | | | | | SVHC | 27/06/2008 | 01/12/2008 |

| Country | Region | Cite | Control | Control Category | Control Subcategory |
|---|---|---|---|---|---|
| European Union | EU | Council Directive 91/414/EEC-Amendment Decision 2001/861/EC, Possible inclusion of Laminarin and Noval | Product Safety | Dangerous - Toxic Substances | Pesticides |
| European Union | EU | Council Directive 91/414/EEC-Amendment Decision 2006/1009/EC: Non-inclusion of dimethenamid in Annex | Product Safety | Dangerous - Toxic Substances | Pesticides |
| European Union | EU | Council Directive 91/414/EEC-Amendment Decision 2007/356/EC, Non-inclusion of trichlorfon in Annex I | Product Safety | Dangerous - Toxic Substance | Pesticides |
| European Union | EU | Council Directive 91/414/EEC-Amendment Decision 2007/379/EC, Non-inclusion of fenitrothion in Annex I | Product Safety | Dangerous - Toxic Substance | Pesticides |
| European Union | EU | Council Directive 91/414/EEC-Amendment Decision 2007/380/EC, Possible inclusion of Candida oleophila st | Product Safety | Dangerous - Toxic Substance | Pesticides |
| European Union | EU | Council Directive 91/414/EEC-Amendment Decision 2007/387/EC, Non-inclusion of dichlorvos in Annex I | Product Safety | Dangerous - Toxic Substance | Pesticides |
| European Union | EU | Council directive 91/414/EEC-Amendment Decision 2007/389/EC, Non-inclusion of malathion in Annex I | Product Safety | Dangerous - Toxic Substance | Pesticides |
| European Union | EU | Council Directive 91/414/EEC-Amendment Decision 2007/392/EC, Non-inclusion of oxydemeton-methyl in An | Product Safety | Dangerous - Toxic Substance | Pesticides |
| European Union | EU | Council Directive 91/414/EEC-Amendment Decision 2007/393/EC, Non-inclusion of diazinon in Annex I | Product Safety | Dangerous - Toxic Substance | Pesticides |
| European Union | EU | Council Directive 91/414/EEC-Amendment Decision 2007/396/EC, Possible inclusion of ethaboxam in Annex | Product Safety | Dangerous - Toxic Substance | Pesticides |
| European Union | EU | Council Directive 91/414/EEC-Amendment Decision 2007/415/EC, Non-inclusion of carbosulfan in Annex I | Product Safety | Dangerous - Toxic Substance | Pesticides |
| European Union | EU | Council Directive 91/414/EEC-Amendment Decision 2007/416/EC, Non-inclusion of carbofuran in Annex I | Product Safety | Dangerous - Toxic Substance | Pesticides |
| European Union | EU | Council Directive 91/414/EEC-Amendment Decision 2007/417/EC, Non-inclusion of diuron in Annex I | Product Safety | Dangerous - Toxic Substance | Pesticides |
| European Union | EU | Council Directive 91/414/EEC-Amendment Directive 2006/132/EC,Correction: Decision 2007/452/EC, Procyr | Product Safety | Dangerous - Toxic Substance | Pesticides |
| European Union | EU | Decision 2006/1010/EC: Non-inclusion of phosalone in Annex I to Directive 91/414/EEC | Product Safety | Dangerous - Toxic Substance | Pesticides |
| European Union | EU | Decision 2006/131/EC: New active substance thiamethoxam | Product Safety | Dangerous - Toxic Substance | Pesticides |
| European Union | EU | Decision 2006/302/EC: Non-inclusion of methabenzthiazuron in Annex I to Directive 91/414/EEC and withdra | Product Safety | Dangerous - Toxic Substance | Pesticides |
| European Union | EU | Decision 2006/409/EC: Provisional authorizations granted for the new active substance profoxydim | Product Safety | Dangerous - Toxic Substance | Pesticides |
| European Union | EU | Decision 2006/584/EC: Authorizations granted for the new active substance beflubutamid | Product Safety | Dangerous - Toxic Substance | Pesticides |
| European Union | EU | Decision 2006/966/EC: Non-inclusion of alachlor in Annex I to Council Directive 91/414/EEC | Product Safety | Dangerous - Toxic Substance | Pesticides |
| European Union | EU | Decision 2007/366/EC: Non-inclusion of thiodicarb in Annex I to Council Directive 91/414/EEC | Product Safety | Dangerous - Toxic Substance | Pesticides |

FIG. 11

```
|NOTIFIER |245| 0.566037735849 |3.139832261753 |1.777263745777
PEER| 245 | 0.481132075472 | 3.173734169211.526985307821
414| 245 |0.867924528302| 1.7563989937| 1.52435312021
RAPPORTEUR| 245| 0.726415094341 2.098378742711 .52429399234
CIPAC| 245 | 0.386792452831 3.901972669571 1.50925357974
230| 245 |0.7264150943411.877590905081 1.36391037444
PESTICIDE | 245 | 0.556603772585 | 2.435635600781 1.35568396647
ACTIVE| 245| 0.9716981132081 1.331543846351 1.29385864315
AUTHORISATIONS| 245 |0.518867924528| 2.486350693361 1.29008762391
FINALISED|245|0.443396226415|2.886052096751 1.27966460894
KYPRIANOU| 245| 0.490566037736|2.570738008564|1.26111679673
MARKOS|245| 0.49056603773612.570738085641.26111679673
MITIGATION|245|0.330188679245|3.768441276951.24429664805
PLANT|245|0.990566037736|1.236068089921.22440707021
INCLUSION|245|0.688679245283|1.773174230921.22114829111
PLACING|245|0.820754716981|1.421042168171.16632706255
SEASON|245|0.367924528302|3.044522243772|1.1201544818
RMS|245|0.254716981132|4.205655083371.07125176652
NONINCLUSION|245|0.273584905663.901972669571.06752082469
STANDING|245|0.716981132075|1.445236896751.03620758635
NONTARGET|245|0.311320754717|3.322154174321.03425554484
451|245|0.377358490566|2.734367509421.03183679601
DOSSIER|245|0.584905660377|1.756319899371.02728145057
IMPLEMENTATION|245|0.688679245283|1.486909593151.024003776421
GROUNDWATER|245|0.358490566038|2.827457932491.01361699466
AQUATIC|245|0.443396226415|2.232470516410.989869002554
```

FIG. 14

| Google | napropamide European Commission | search | Advanced Search Preferences | web — Results 1 – 10 of about 896 for napropamide European Commission (0.10 seconds)

Committee on Technical Barriers to Trade – Notification – European ...
European Commission EC-TBT Enquiry Point Fax (32) 2.299 8043 E-mail...ICS numbers
May be provided in addition where applicable Napropamide

(coc) Hello EC TBT Enquiry Point
File Format Microsoft Word – View as HTML
The European Commission insisted that the product be withdrawn now and offered ... The
EC may continue to allow the inclusion of napropamide in Annex I to ....
ec europa eu/enterprise_ repository/EEC203_EN_1 dec – Similar pages (pdf) Full page fax print
File Format PDF/Adobe Acrobat – View as HTML
Please find attached the reply of the European Communities to your comments ... Draft
Commission Decision concerning the non-inclusion of napropamide ..
ec europa eu/enterprise/repository, EEC203_EN_3 pdf Similar pages
More results from ec europa eu"

Simple determination of the herbicide napropamide in water and ...
the standards of sensitivity by the European Drinking Water Directive is ....22
Currie LA IUPAC Commission on analytical nomenclature, ....
dci wiley.com/10. 1002/ps 1054 – Similar pages ....
by A Salinas-Castillo – 2005 – Cited by 1 – Related articles – All 7 versions

Determination of Diphenamide, Napropamide and Metolachlor in ...
napropamide and metolachlor residues in the fluecured tobacco leaves ..... 19) The

```
dec_2008_902_2_en.txt|165|PLACING|1.2250363518
dec_2008_902_2_en.txt|260|DISPOSAL 1.35126764089
dec_2008_902_2_en.txt|142|172|1.14389207719
dec_2008_902_2_en.txt|140|PREJUDICE|0.90902448468
dec_2008_902_2_en.txt|245|NOTIFIER|1.77726374577
dec_2008_902_2_en.txt|245|PEER|1.52698530782
dec_2008_902_2_en.txt|245|414|1.52435312021
dec_2008_902_2_en.txt|245|RAPPORTEUR|1.52429399234
dec_2008_902_2_en.txt|245|230|1.36391037444
dec_2008_902_2_en.txt|245|PESTICIDE|1.35568396647
dec_2008_902_2_en.txt|245|ACTIVE|1.29385864315
dec_2008_902_2_en.txt|245|AUTHORISATIONS|1.29008762391
dec_2008_902_2_en.txt|245|FINALISED|1.27966460894
dec_2008_902_2_en.txt|245|PLANT|1.22440707021
dec_2008_902_2_en.txt|245|INCLUSION|1.22114829111
dec_2008_902_2_en.txt|245|PLACING|1.16632706255
dec_2008_902_2_en.txt|245|SEASON|1.1201544818
dec_2008_902_2_en.txt|245|NONINCLUSION|1.06752082469
dec_2008_902_2_en.txt|245|STANDING|1.03620758635
dec_2008_902_2_en.txt|245|451|1.03183679601
dec_2008_902_2_en.txt|245|IMPLEMENTATION|1.02400377642
dec_2008_902_2_en.txt|245|GROUNDWATER|1.01361699466
dec_2008_902_2_en.txt|245|AQUATIC|0.989869002554
dec_2008_902_2_en.txt|256|ORGANISMS|1.45958093308
dec_2008_902_2_en.txt|256|NOTIFIER|1.30826359064
dec_2008_902_2_en.txt|168|USES|0.890862997
```

FIG. 16

```
2008_309_09_proc_en.txt|143|3.17597015472|33|1.362115579324|European Union|EN
2008_309_02_opinion_en.txt|235|5.5153946683|155|4.8670535662|European Union|EN
reg_1206_2008_en.txt|91|3.674434825585|95|2.57030176929|European Union|EN
reg_1202_2008_en.txt|145|3.574128789|55|2.886052098675|European Union|EN
2008_309_06_proc_en.txt|155|4.307437777768|146|3.389657777388|European Union|EN
2008_309_01_opinion_en.txt|235|5.5153946683|155|4.8670535662|European Union|EN
reg_1203_2008_en.txt|145|3.574128789|55|2.886052098675|European Union|EN
2008_309_03_info_en.txt|55|3.4944980104|165|1.7176519128|European Union|EN
2008_309_10_proc_en.txt|48|4.325786049242|91|3.6744348585|European Union|EN
2008_309_07_proc_en.txt|246|3.016068415349|165|2.99636219998|European Union|EN
reg_1204_2008_en.txt|161|3.938243540432|242|3.280030161988|European Union|EN
dec_2008_902_2_en.txt|245|23.8311932694|256|2.767844452372|European Union|EN
2008_309_04_info_en.txt|159|1.404308997556|256|2.767844452372|European Union|EN
2008_309_08_proc_en.txt|55|12.803547454504|232|7.416062277885|European Union|EN
dec_2008_902_en.txt|230|1.346432677784|95|0.0|Europan Union|EN
reg_1205_2008_en.txt|232|4.975111109257|146|4.969636289565|European|Union|EN
reg_1201_2008_en.txt|55|3.38312862026|174|1.475581150303|European Union|EN
2008_309_05_not_en.txt|234|2.263980762965|242|1.445802553333|European Union|EN
```

You are here: Home : New Clients: test_client2: preferences

| View | Edit | Sharing |

Edit My News Preferences
A client My News preferences

| Default ■ | Categorization | Dates | Ownership | Settings |

Title ■

User Preferences Within the Group
Description
Used in item listings and search results
My News: Setting the individual preferences of a member within a group for a Test Client Countries
Choose a country you wish to subscribe to

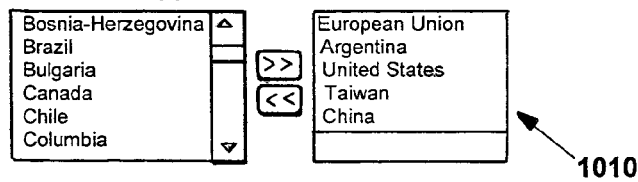
↘ 1010

Topics
Choose the topic you want to subscribe to

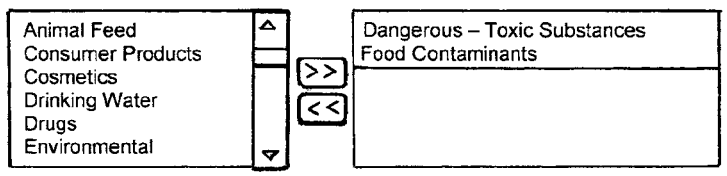

Subtopics
List of Subtopics

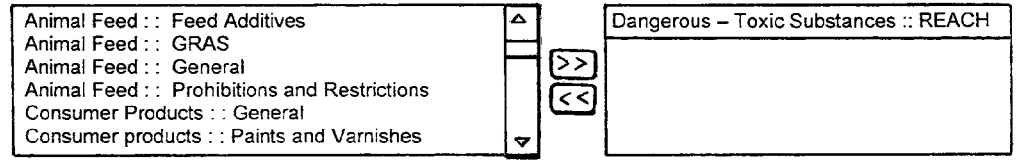

FIG. 20

| Food and Consumer Products | Product Safety | Contaminants | Issue Tracking | My News | Substance Tracking | Newsletter Admin | Trend Analysis |

You are here: Home : New Clients: test_client2: Substance Tracking Preferences

View  Edit  Sharing

Edit Substance Tracking Preferences
Substance Tracking Preferences

| Default ■ | Categorization | Dates | Ownership | Settings |

Title ■

Substance and Commodity Tracking preferences

Description
Used in item listings and search results

User group substances

Substance Name
Please enter a valid substance name one per line with or without a wildcard (*), e.g. Formaldehyd caffeine
paraquat
hydrogen peroxide  ← 1020
TCPP
Halofuginone

CAS Number
Please enter a valid CAS number one per line, e.g. 60-00-0

35677-85-9
39957-36-8
20-05-7
25956-17-6  ← 1021
101831-37-2

DID
Please enter the DID of the substances you wish to subscribe to (One per line ), e.g. 1055

FIG. 21

| Food and Consumer Products | Product Safety | Contaminants | Issue Tracking | My News | Substance Tracking | Newsletter Admin | Trend Analysis |

You are here: Home : Substance Tracking

Substance Tracking

Edit Preferences

My News Filter | No Filter
[1]

→ 1030

| Publication Date | Substance Name | CAS Number | Citation | Country | Topic |
|---|---|---|---|---|---|
| | Paraquat | 2074-50-2 | | | |
| 2011-06-07 | Paraquat | 2074-50-2 | Agricultural Chemical Products | Australia | Dangerous-Toxic Substance |
| 2011-06-01 | Paraquat | 2074-50-2 | NGO and trade unions call for safe regulations of hormone disrupting chemicals | | |
| 2011-05-27 | Paraquat | 2074-50-2 | Commission Regulation (EU) No 5202011 of 25 May 2011 amending Annex II and III to Regulation (EC) No 360/2005 of the European Parliament and of the Council as regards maximum residue tests for benataxyl, bopcaid catobean carbosulfan cypometin bupofezin, carbofuran mettalunizone methalgyfenozine paraquat prochloraz Prothioconazole and zincamide in or on certain products | European Union | |
| 2011-05-19 | Paraquat | 2074-50-2 | Amendment pertaining to Annex I Article 3 and Annex IV Article 6, Standard for Pesticides Residue limits in Foods No 100130/1440 (Chinese) | Taiwan | Food Contaminants |
| 2011-05-18 | Paraquat | 2074-5-2 | California 2010 Health and Safety Code Exempts | United States | Environmental |
| 2011-06-15 | Paraquat | 2074-5-2 | TEDX list of Potential Endscene Disruptions | NGO | Dangerous-Toxic Substances |
| 2011-05-13 | Paraquat | 2074-50-2 | Notice of Partial Amendments to Food Standards and regulations | Korea | Food Standards |
| 2011-01-26 | Paraquat | 2074-50-2 | Rotmone Paradim and Parkinson277's disease | United States | Dangerous-Toxic Substances |
| 2011-01-25 | Paraquat | 2074-50-2 | Modification of the current MRLs in various commodities | European Union | Food Contaminants |

FIG. 22

| Food and Consumer Products | Product Safety | Contaminants | Issue Tracking | My News | Substance Tracking | Newsletter Admin | Trend Analysis |

You are here: Home : Name : New Clients : test_client2

Edit Preferences  Email Report 1 2

→ 1040

| Publication Date | Country | Agency | Type | Citation | Topic | Subtopic | Issue | Mark or Unmark |
|---|---|---|---|---|---|---|---|---|
| 2011-06-07 | United States | Center for Disease Control (CDC) | Report | No Progress in Salmonella During Past 15 Years | Food Contaminants | Microbiological Contaminants | Create Issue  Go | Mark as read |
| 2011-06-07 | United States | Environmental Protection Agency (EPA) | Notice | EPA Takes Major Actions to Reduce American risks from Mouse and Rat Poisons. More will better Protect children, pets and wildlife | Dangerous-Toxic Substances | Pesticides | Create Issue | Mark as read |
| 2011-06-07 | European Union | European Parliament | Meeting | E colli outbreak lessons to be learnt for the future | Food Contaminants | Microbiological Contaminants | Create Issue | Mark as read |
| 2011-06-07 | NGO | ChemSec-International Chemical Secretariat | Press Release | | Dangerous-Toxic Substances | REACH | Create Issue | Mark as read |
| 2011-06-06 | United States | National Institutes Of Health (NH) | Report | TR-561 NTP Technical Report on the Toxicology and Carcinogenesis Studies of Tetmalin (CAS No 119-64-2) in F344/N Rats and BCC361 Mice Inhalation studies | Dangerous-Toxic Substances | Existing Substances | Create Issue | Mark as read |

FIG. 23

| Food and Consumer Products | Product Safety | Contaminants | Issue Tracking | My News | Substance Tracking | Newsletter Admin | Trend Analysis |

You are here: Home

Trend Analysis

Step 2 – Please select a start date, stop date, then click next

| Step 1 Complete ! | Step 2 Incomplete | Step 3 Incomplete | Step 4 Incomplete |

─── 1070

Time period

Start
[09-Dec-10]

Stop
[09-Jun-11]

[← Start over]    [Next →]

FIG. 25

Food and Consumer Products | Product Safety | Contaminants | Issue Tracking | My News | Substance Tracking | Newsletter Admin | Trend Analysis You are here: Home ←— Start over

Trend Analysis

Step 3 – Please select variables, then click next

| Step 1 Complete ! | Step 2 Complete ! | Step 3 Incomplete | Step 4 Incomplete |

Variables

Country
Select options

Region
1 selected

√ Check all
✗ Uncheck all
√ Middle East
☐ Latin America
☐ North America
☐ Asia Pacific
☐ International
☐ European Union

— 1080

Next —→

FIG. 26

Food and Consumer Products | Product Safety | Contaminants | Issue Tracking | My News | Substance Tracking | Newsletter Admin | Trend Analysis You are here: Home

Trend Analysis

[← Start over]

Step 4 – Please select filters, then click create chart

| Step 1 Complete! | Step 2 Complete! | Step 3 Complete! | Step 4 Incomplete |

Filters

Module: [1 selected]

Ruletype: [Select options]

Topic: [6 selected]
- ✓ Check all
- ✓ Uncheck all

Subtopic: [Select options]

[Next →]

Popup (1090):
- ☐ Drinking water
- ☑ Food Contact
- ☐ Workplace
- ☑ Food Additives
- ☐ Environmental
- ☐ Drugs

FIG. 27

APPARATUS AND METHOD FOR THE AUTOMATIC DISCOVERY OF CONTROL EVENTS FROM THE PUBLICATION OF DOCUMENTS

BACKGROUND AND SUMMARY OF THE INVENTION

The present invention discloses an apparatus and method for the automatic discovery of control events from the publication of documents over the Internet or other network.

A document published electronically in the Internet or received over a network may have an important effect on the control of goods and services delivered in a global economy. Whether proposed or final, a new or modified law, regulation, standard, study, guideline, finding, health alert, product recall, governmental or advisory announcement are all examples of publications that the producer or manufacturer of the good or service must be aware of as soon as possible if they influence his business or interests. Such a publication, stream of data, or electronic document represents a critical control event that may influence the producer's or manufacture's actions and business process with regard to the good or service. For instance, if a new regulation is published that restricts the usage of a manufacturer's product or raw materials anywhere in the world, published in any language, the manufacturer's regulatory experts must be made aware of that publication immediately. Similarly if a new toxicological study has found that a substance has an adverse environmental or health effect, the manufacturer has an important managerial duty, potential liability arising from, and economic investment in knowing of such a publication and in responding quickly. Indeed a product recall may be necessary to carry out as a result.

The need to be well informed of relevant control events applicable to producing goods and services in a global economy applies to all actors in a supply chain, whether manufacturer, distributor, customer, service provider or government. Accordingly it would be desirable to provide a system and way to discover automatically relevant information associated with control events that can be passed to all actors in a supply chain. Further it would be highly useful to pass the discovered information as signals to an enterprise system enabling early warning and transaction control. Such a system would be applicable to many facets of the supply chain, including use by the direct participants in the supply chain in manufacturing, product review, distribution, transport and inspection processes, use by government agencies such as customs and border control agencies, for example, to assist in the identification of targeted inspections, and food- and health-regulating agencies (e.g., the FDA or CDC) for targeted regulation and enforcement efforts, and use by information service providers offering services coordinating distribution of such information within a supply chain.

Today the discovery of control events is achieved by manual methods or with access to a number of disparate systems by which the user with expert knowledge will search for news events of concern to a business process. In this case, by analogy to the driver of an older car or the pilot of early plane, the accuracy and safety of the manufacturing or business process depends entirely on the knowledge and skill of the driver or pilot. In a modern car and plane, we do not simply depend on the skill of the human pilot; a number of processors are connected in order to detect control events, such as a skid of a car or a rapid descent of a plane, and communicate them to the human pilot of the vehicle. It is important to assist the expert managers of a manufacturing process in a similar way. Given the importance and complexity of manufacturing and business processes in a global economy it is desirable to have a system and method by which the collection of news events—as control events to a manufacturing or business process—is not simply a human expert reviewing a news clipping service but an automated system and method that can be interconnected to enterprise systems, visualization systems, and other action-oriented response systems. The publication of a toxicology study on the effect of artificial colors used in confectionary on hyperactivity in children should be detected, communicated by a system and method as a signal to a manufacturer using such ingredients as raw materials and presented to management through visualization techniques as a pilot receives a signal and visualization in a heads-up display in the pilot's helmet.

It is desirable for a manufacturing process to have a system and method for the analysis and visualization of emerging issues that may affect the manufacturer and the manufacturer's supply chain. In the case above, the system and method of discovery of control events assists a single expert. However, such a manufacturing process may need the assistance of expert groups that are geographically distributed and which manage highly complex scientific and regulatory tasks in a global operation with global customers. In a manner analogous to the need for a car with distributed processors to control events automatically in rapid coordinated response on a modern high-speed highway, the group of experts may need automated processes to communicate, coordinate and manage emerging issues collectively in response to new events such as a new scientific study, a new regulation, or a new customer requirement, or an event, such as a product warning or recall that may arise anywhere in the world in any language. Typically, evaluation of such issues has been a time- and resource-consuming effort which has not been amenable to automation and which has not difficult to coordinate on a global basis in a timely manner. Thus, what is also needed is a method and system, including analytical and visualization tools, for the group to plan the distribution of responsibilities, communicate events of key concern, and to determine the impacts and policies necessary for the operation to respond. The process may be within a manufacturer, service provider, government agency, or association. Further, once a news event of concern is identified an automated method and system for informing other members of the group needs to be established through which other members of the group can be informed according to their functions or preferences.

Systems and methods for personalizing and aggregating news content are well known. An example of such a method is Google News™. Google News™ aggregates and classifies news stories authored by other news publishers in an automatic manner. In contrast, in the present invention is not a news aggregation service but an apparatus and method to discover critical control events relevant to a supply chain using a novel discovery and classification technique, which may be linked to an enterprise system to pass signals and early warning for transaction control of goods and services. Other known methods have defined how to enable the enhancement of reference data taken from a variety of sources. For example, financial markets may receive press releases from companies identified by stock symbol and a variety of other types of information which can be advantageously rendered into a value-added and centralized view through methods previously defined. The present invention does not merely enhance the value of input reference data for which the relevance is known, but rather provides an apparatus and method to discover through classification the relevance of an unknown original publication and then produces information essential to controlling goods or services in a supply chain.

Today the actors in a supply chain have a limited number of options available to them to become informed of publications that represent critical control events: They may: a) manually check relevant web-sites one-by-one; b) subscribe to specialized news publications that summarize the actions taken of importance; c) retain consultants to perform this as a service; d) join trade associations where committees seek to monitor such events; and e) perform searches in one of the major Internet search engines. These are inefficient and involve delay. It would be desirable to have a centralized source of information, rather than relying on checking web sites individually, a labor-intensive activity requiring expert knowledge (for example, to know which web sites are important in a global economy). However, a short-coming of centralized web-searching at present using the major web-search engines is that they are limited in their capability to search across technical and linguistic content. For instance, if the search involves a chemical substance, a search in any of the major engines, including Google™, will return only hits for the English term, "acetic acid," but will not return in the same search any translation such as "acide acétique" (French) or "Essigsäure" (German). If a producer of a good or service dependent on acetic acid searched new regulations or studies, a search using today's search engine would fail to produce hits for the French or German terms without entering each one individually, but to achieve the result the user would have to know in advance the relevant translations for which to search. The same difficulty applies to a search for commodities, e.g., strawberry (English) vs. fragola (Italian) vs. Erdbeere (German). In addition, the same limitation also applies to toxins and diseases. Finally, such web-services not only cannot address multi-lingual searching for publications of relevance to a supply chain, but they also do not classify the relevance of the publications to control events for a supply chain. The present invention provides an apparatus and method to establish a centralized as well as customized information services based on the automatic discovery of publications that must be made known to the producer of a good or service in a global economy.

Other resources are also available to the user: Information services are in wide use by which the user who wishes to be informed of an event may establish personalized alerting of news of interest by storing a query that is run with a frequency defined by the user, often referred to as "clipping services". Lexis-Nexis has an Alert feature that is an example of such a service. The Federal Register also offers an alert service for registered users. However, there are limitations to such services: a) The user must know a priori the relevant search terms and queries that will find a relevant document; b) in a global context the definition of such terms and queries would be complicated by the need to translate the terms of the query across many languages for a given issue; c) the user may need to be aware of and subscribe to many such services in order to obtain the necessary coverage of international subject matter; and d) the user's knowledge to enter a term or query would not be capable of being optimized, improved by, or of including terms used by other experts or by a system that could calculate a more robust selection set from an information source. In brief, the user can easily miss important information given the limitations of today's clipping services.

Further, the analysis of trends by an individual analyst or expert is typically in the context of a defined strategy for coverage of news events of concern may also be problematic. Some organizations divide the coverage of events of concern geographically, with individuals assigned to a country or region. In other cases the division of responsibility may be functionally aligned, such as coverage of food additive requirements by one individual or group, or coverage of food packaging requirements or a type of chemical hazard by others. However, such an approach to issue coverage suffers from the same resource limitations and timeliness problems noted above. Thus, it would also be To achieve centralized information sources across the Internet, Google™ and others have provided for page-ranking algorithms to index and make available web-pages collectively deemed important through a method of voting based on cross-page references. However, if the publication on a given web-site is very new and the need is urgent for the user to know that the publication has been released, there is not enough time for a voting or ranking algorithm based on other links to reference it and thus to rank it highly among many thousands of references in responding to a query by the user of an Internet search engine. In short, publications of high importance and recent release can easily be missed. It would be desirable to have a ranking system based on a broader pool of knowledge which would act in the place of the human expert carrying out and improving on the results possible through current methods, and which would be implemented using artificial intelligence functionality.

With regard to existing artificial intelligence methods, significant research has occurred in the area of text classification by automatic means. Computer-based systems and methods for finding rules of law in text have been defined. Document classifying systems have been developed to build classification decision trees. Further, systems have been invented for automatically and rapidly classifying or declassifying military intelligence, government, and industrial documents to protect sensitive or classified information. Some of the techniques used in document classification include artificial neural networks, Bayesian learning, decision-tree learning, genetic algorithms, cluster, vector and other statistical techniques, and rule-based analysis. Typically these are applied to documents available to the user or transmitted to the user. For example, a spam filter by automatic means eliminates unwanted emails, or an automatic classification is carried out for a known library of documents into categories. It would be desirable to have an automatic system to search for and discover new publications that can then be passed to such a classification method that produces not only an ontological or hierarchical collection of terms, but more specifically a means to relate those classification outcomes to a system of control events that can then be related to critical control points in a business process.

A control event for the producer of a good or service may be considered by analogy to a system used to achieve food safety developed by the U.S. FDA, called Hazard Analysis and Critical Control Point Principles (HACCP). According to FDA, "HACCP is a management system in which food safety is addressed through the analysis and control of biological, chemical, and physical hazards from raw material production, procurement and handling, to manufacturing, distribution and consumption of the finished product." http://www.cfsan.fda.gov/~comm/nacmcfp.html. The goal of a HACCP strategy is to define all of the critical control points in a process or supply chain that can be applied to prevent or eliminate a food safety hazard. A critical control point is a step at which control can be applied to prevent a food safety hazard. In one embodiment of the present invention, a control event is one relevant to a critical control point and is associated with the publication of one or more documents.

For example, if the manufacturer is engaged in the development and sale of food additives, then a critical control point would include the determination that compliance had been achieved with all relevant requirements of the jurisdictions in which the product was marketed and sold. A newly published regulation or toxicological study would, for example, represent a control event associated with such critical control points in the manufacturing process.

As used in this invention control events are considered generally related to the production of any good or service and are defined as key elements or categorizations of the production of a good or service in a supply chain. Once control events are defined and are mapped to the control points of a specific business or manufacturing process it becomes possible to automatically monitor and identify publications relevant to a particular control event. All subscribers to a centralized information service can then be quickly informed of events that affect the production, marketing, and distribution of the good or service in a defined informational structure. The automatic identification of control events offered by the system and method of the present invention then can be passed in a structured way as signals to alert the management of a supply chain in the same manner that control signals can be sent by an information system through a network to control a motor. In order to achieve this objective an association, protocol or mapping must be defined for what information and how it is to be sent to the motor and control events serve a similar purpose here with regard to alerting a supply chain.

The apparatus and method of the present invention involves a number of steps. One step is to define by manual or algorithmic methods the source web-sites or received electronic information or data that correspond to a plan for geographic and subject matter coverage of interest to the actors in a supply chain. These web-sites, received electronic information, or data would be the sources of the publications or control events to be monitored. Four example web-sites of immediate interest to the regulatory compliance of food processors are: The U.S. Federal Register, FDA's web-site of the Center for Food Safety and Applied Nutrition, the European Union, and European Food Safety Authority (EFSA). In an alternative embodiment an existing source of or index to documents in the Internet or in a network could be used as the source of the publications to be examined by the classification process described below.

Based on the plan of coverage, a diverse number of websites, data sources, or electronic information sources are monitored on a regular basis by a master control application running on a server computer to identify whether a new publication has been released and its type. For example, the Federal Register would be monitored on a daily basis to identify notices, proposed rules, and final rules as publication types. Taking another instance, the European Food Safety Authority (EFSA) might release a new scientific opinion of the Panel on Food Additives, Flavourings, Processing Aids and Materials in Contact with Food. A master control program routinely accesses each defined Internet or network source and seeks to identify the publications of interest using one or more methods according to the invention that result in a collection of publications or publication references.

The identification of candidate publications or control events of possible interest within a web-site or data source is carried out by one or more methods that include but are not limited to: applications running on the server computer that make a simple examination of each new publication or received electronic information, applications that examine the date of files stored on the target source; applications that include algorithmic methods for the selection of publications, and screening applications running to inspect the web-site based on selection criteria. The step concludes with a set of new candidate publications or data or electronic information received of possible interest for the time period defined.

Each of the candidate publications or received electronic information is submitted to a classifier application running on a server computer connected to a database containing document elements—for example, word terms, fragments, phrases, spatial or formatted document sections, and images—corresponding to a set of predefined control categories. The task of the classifier is to analyze the occurrence of such elements to determine whether the document or received electronic information contains a control event. This classification step provides an intelligent function based on a collective analysis of a large corpus of relevant publications and other electronic data that can optimize the possibility of finding a publication or received electronic information of interest by automatic means in order to save the time of the user and to improve the accuracy of the search. Further, in one embodiment of the present invention the classification method is a learning function that can improve the results of classification over time based on feedback. The classification step though cannot be carried out without the result of the master control program to identify what is new and to process the type of the publication.

A number of different classification methods are known and may be used. These include, but are not limited to, Bayesian Analysis, Inverse Term Frequency Analysis and other statistical methods that analyze the word content or other attributes of the publication document in order to assign the document to a particular control category. For example, in one embodiment, the database contains a list of word terms associated with a control category and the classifier application extracts and counts the occurrence of such words in the publication. Based on the classification method selected, an equation is applied to the cumulative frequencies of terms found in the document in order to produce a weighted score of whether the publication belongs to a control category. For example, in an Inverse Term Frequency Analysis, the occurrence of words strongly associated with a single category but weakly associated with all categories is given higher weight. Thus words like "regulation" may appear in all control categories of a set of documents that are published regulations. In contrast, words and phrases like "pesticide residues" would receive higher scores because they are associated with a limited set of control categories dealing with the control of contaminants in foods. However, some web sources of publications may be pre-classified a priori and any publications from such a highly specific web-site can be assigned to a particular control category.

In a preferred embodiment the classifier application running on a server computer connected to a database contains a collection of relevant terms together with their weighted scores, based on the analysis of a trained set of multilingual publications. Depending on the method of the analysis used, the occurrence of the terms in the document is calculated using the weighted scores associated with the terms found in the database. To determine the accuracy of the weighted terms for a given control category, one method is to randomly select a subset from among publications that have been previously assigned by manual or expert means. In such an example, the randomly selected test set of publications would be withheld from the training run of known documents. Then the classification of the random subset can be compared against the manual classification in order to determine whether the overall result is accurate.

The output of the classifier application is a determination that a publication or received electronic information is relevant to one or more pre-defined control categories and the automatic preparation of a summary report that is then loaded to the database of a server. An example of a control category would be: "Product Recalls". Such information may be received electronic data, information contained in a received document, or published on a web-site. The information resulting from the classification process will, for example, include the determined control category and sub-categories, the citation, a hyperlink to the source document, and any summary statement.

In a preferred embodiment of the present invention, another classification step occurs in which a multi-lingual analysis of the document is made by an application program running on a server computer in order to identify any specific reference to a product, substance, food or foodstuff, biological agent, disease, and commodity. The application program uses an indexed database of multilingual terms that are sorted by a number of different methods that include but are not limited to an inverted order with the longest terms occurring first. A list of all found references relevant to goods and services is then added to the summary information about the publication determined from the previous classification step. In this preferred embodiment, any reference to "acetic acid" or "strawberry" would, for example, be found. As a result, in the first classification step, information about the control category is determined, e.g., that FDA has published a proposed change in the regulation of sanitizing solutions in food processing equipment, which is assigned to a control category, "food contact", and that the proposed regulation applies to solutions containing "acetic acid". Thus, the present invention provides for a system and method to automatically discover and assign a control event or categorization to the newly published document, received data, or electronic document and to analyze which product, substance, food or foodstuff, biological agent, disease, and commodity it might apply to in a multi-lingual manner without geographic limitation.

On the basis of the output reports stored within the web-based content management system, a centralized information system can be provided to subscribers within the supply chain or other interested parties.

According to a further feature of the invention, the output reports are structured in such a manner, using one or more protocols to format the information, so that the information may be loaded as data into an enterprise resource planning system (ERP), such as SAP, ORACLE, or similar system. This would also apply to other specialized product life cycle management systems (PLM) or report generation systems used for product control. For example, a set of control events or categories can be associated with standard phrases that can be loaded into the enterprise system which can then be associated with reports to be generated from the enterprise system or transactions to be controlled by the enterprise system. The control event or information signal may be output from the centralized information service of the present invention and transmitted to the enterprise system in a number of different ways. The enterprise system can receive and consume the control event that can be passed through a query or using a structured information protocol, such as XML or as a web-service, or by a number of different methods. Such methods also permit customization of the information service and the mapping of the control events to the needs of the user of the enterprise system.

The output of the preferred embodiment includes the structured identification of one or more products, substances, foods or foodstuffs, biological agents, diseases, commodities, risk conditions, hazards, user-customized issue conditions to which a document, received electronic information or data may apply. Further, the output of the preferred embodiment includes a control event associated with the document. These can be loaded as alerts to facilitate transaction control by the enterprise system. Thus the present invention provides a system and method to reduce the amount of time between the receipt of an electronic document, data, or the publication of a new or proposed law, regulation, standard, study, guideline, finding, health alert, product recall, governmental, commercial, or advisory announcement and the capability for an expert subscribing to the information service offered by the invention to act and, in addition, the capability for a subscribing enterprise system to load early warning signals for transaction control in a business-to-business exchange of information using any one of a number of data exchange protocols.

Other objects, advantages and novel features of the present invention will become apparent from the following detailed description when considered in conjunction with the accompanying drawings.

BRIEF DESCRIPTION OF THE DRAWINGS

FIG. 3 is an example illustration of output of a classifier application in accordance with an embodiment of the present invention.

FIG. 4 is an example illustration of results of extraction by the information system in accordance with an embodiment of the present invention.

FIG. 5 is an example illustration of hyperlinking to a source page by the information system in accordance with an embodiment of the present invention.

FIG. 11 is an example illustration of a collection of pre-classified publications associated with control events in an embodiment of the present invention.

FIG. 14 is an example records of a database of terms statistically associated with control events in an embodiment of the present invention.

FIG. 15 is an example search using a major search engine, Google™, to find an example publication.

FIG. 16 is an example set of results for a classification of an example publication in one embodiment of the present invention.

FIG. 17 is the output of the classification application for an example series of publications in one embodiment of the present invention.

FIG. 20 is a computer screen view of a user group definition function associated with the FIG. 19 computer screen.

FIG. 21 is a computer screen view of a user substance preference selection function usable with an embodiment of the present invention FIG. 22 is a computer screen view of results of a determination of content of interest to the user employing a substance tracking filter of FIG. 21.

FIG. 23 is a computer screen view of user-selectable event in a listing of results of a determination of content of interest to the user highlightable for forwarding as an alert to other users of a user group in accordance with an embodiment of the present invention.

FIG. 25 is a computer screen view of a second screen of a trend analysis visualization program in accordance with an embodiment of the present invention.

FIG. 26 is a computer screen view of a third screen of a trend analysis visualization program in accordance with an embodiment of the present invention.

FIG. 27 is a computer screen view of a fourth screen of a trend analysis visualization program in accordance with an embodiment of the present invention.

DETAILED DESCRIPTION OF THE INVENTION

Figure 1:
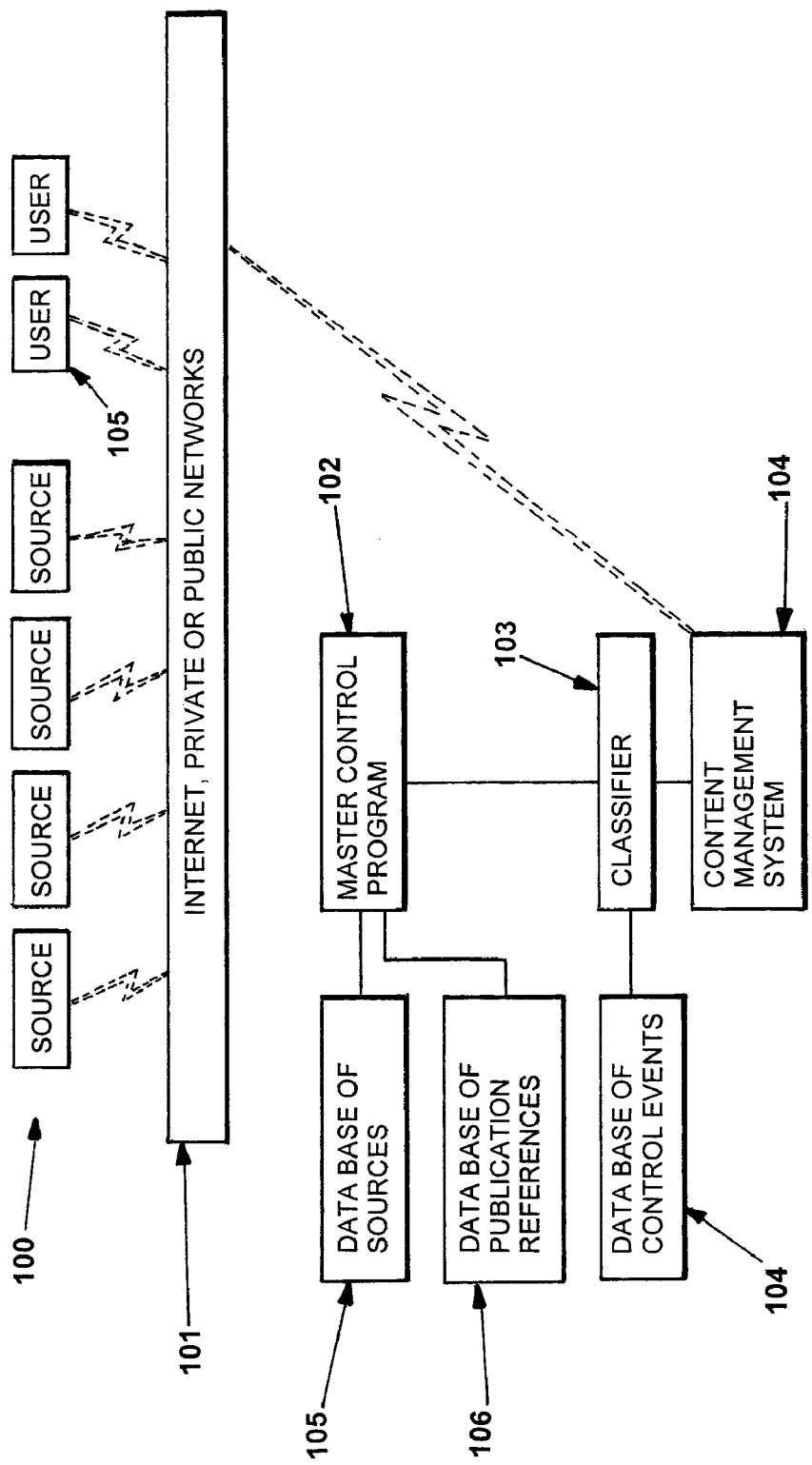
FIG. 1 is a block diagram of elements of an embodiment of the present invention.

Referring to FIG. 1, the system is composed of a number of elements. The first element is the source of information containing the publications to be analyzed. The sources of information 100 include but are not limited to: web-sites, a data stream, submission of an electronic document to a network, an input source database library of documents, or files resident on a network. These are accessed by the applications of the present invention running on a computer server processor via one of the Internet, a private and public network 101. As illustrated in network 101 the ultimate users and the sources of the publications may be all on the Internet or on different networks. The sources of the publications may also be obtained from another provider of an information service or aggregator rather than obtained directly.

Figure 2:
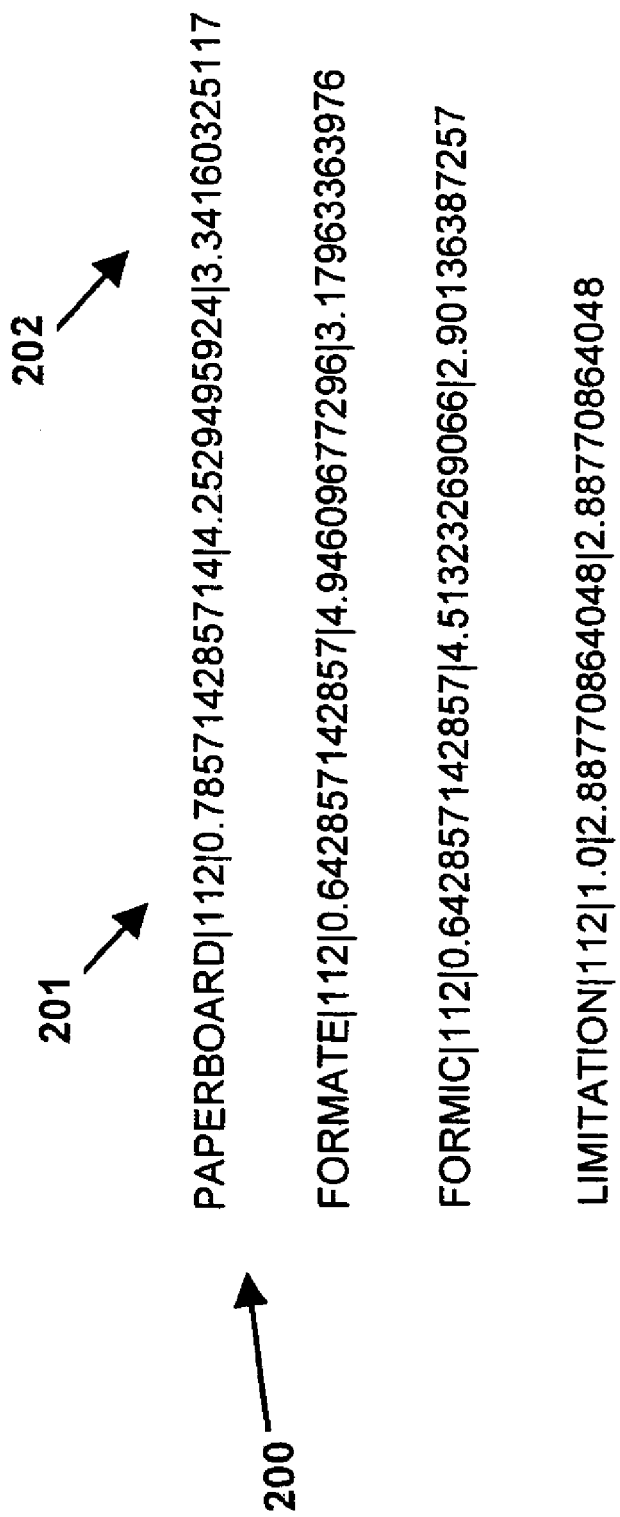
FIG. 2 is an example illustration of a word terms database content in accordance with an embodiment of the present invention.

The Master Control Program 102 running on a computer server processor polls each source of information 100 from a database of identified sources 105 to determine the publications to be analyzed by the classifier and their type. Alternatively, the publications and references can be provided by another information provider or aggregator. References to publications found are stored in a database 106. The candidate publications, data stream, or electronic documents are submitted to a classifier application running on a server computer 103 connected to a database containing document elements, associated control events, and any weighting data, rules, or functions to be called during the classification 104. For example, referring to FIG. 2, one embodiment of the application includes a database of word terms 200 that are associated with key codes 201 representing control events that are given weighted scores 202. In the example of FIG. 2, several word terms are given that are associated with the control event or category of "food contact with paper or paperboard," which has been given the identification number 112, In the example, these word terms include "paperboard", "formate", "formic" and "limitation." Such terms can be in any language. Further, the document elements used in the classification process include word terms, fragments, URL references, phrases, spatial or formatted document sections, and images. The task of the classifier is to analyze the occurrence of such elements to determine whether the document contains a control event using the classification method selected. In this example, if the classification program running on the server apparatus scans the words in the document and finds the word "paperboard" in the publication then the relevant weighted score is given to the calculation of whether a control event has been detected. Thresholds may be defined to filter out false positives and false negatives. As mentioned, a number of different classification methods to accomplish the classification are known to those of ordinary skill in the art.

The output of the classifier application is a determination that a publication, data element, or electronic document is relevant to one or more pre-defined control categories and the automatic preparation of a summary report that is then loaded to the content management system 104. Referring to FIG. 3, an example of this output is given. At 301 the general categories of control events are provided by the information service, in this case covering the areas of product safety and food and consumer products. A particular control event has been passed to the information system running on a server processor at 300. In this case, it is an indication that the European Chemicals Agency (ECHA) has received new nominations of chemicals deemed to be of high hazard potential. The control event has been categorized at 302.

FIG. 4 illustrates results of the extraction by the information system from the document chemicals identified in the underlying document. FIG. 5 illustrates the provision of a hyperlink to the source page by the information system of this embodiment.

The output of the preferred embodiment includes the structured identification of one or more products, substances, foods or foodstuffs, biological agents, diseases, and commodities to which a document may apply. Further, the output of the preferred embodiment includes a control event associated with the document. These can be loaded as alerts to facilitate transaction control by the enterprise system. Thus the present invention provides a system and method to reduce the amount of time between the receipt of a data element, electronic document, or the publication of a new or proposed law, regulation, standard, study, guideline, finding, health alert, product recall, governmental, commercial, or advisory announcement and the capability for an expert subscribing to the information service offered by the invention to act and, in addition, the capability for a subscribing enterprise system to load early warning signals for transaction control in a business-to-business exchange of information using any one of a number of data exchange protocols. In addition, the present invention enables the communication of the control event to an individual human expert and the capability of the expert team and management to coordinate and respond to a variety of control events that may themselves be related.

An example is illustrated with FIGS. 11-17. A database of control events 104 is populated so that the Classifier application 103 can operate. One way to accomplish this is to use a collection of documents with known control events. Referring to FIG. 11, in an embodiment of the present invention, a collection of documents is obtained in which whatever control events applicable to each publication have been pre-classified by methods that include, but are not limited to, the following: a) the collection may be manually classified by a human expert; b) one or more key words may be used to identify an initial set of publications from which other publications can be inferred by examining referenced citations or other page links on the page; c) publications, electronic documents or data elements of interest may be inferred by the patterns of user searches of users known to have interest in a control event from an analysis of the usage logs of a search engine, and from this set of terms the initial set of publications is made; and d) a predefined library of publications can be obtained. The relevant control events are defined for the initial set of publications, documents, or data, for example, the country 1100, region 1101, citation 1102, and a set of control categories 1103, such as product safety, dangerous & toxic substances, sub-category pesticides.

A method is selected to populate the database of control events 104 with attributes that would include but not be limited to the document element and its associated control event. The methods may include, but are not limited to: a) manual entry of terms and weights; b) statistical methods, such as Bayesian analysis and inverse term frequency analysis; c) citation matching; and d) ranking methods, such as URL cross-referencing. FIG. 14 illustrates one embodiment of the present invention where word fragments have been associated with statistical weights that are then used to calculate whether the occurrence of these terms found in a candidate publication results in a classification of the publication into a particular control category. In FIG. 14, the terms extracted are associated with control events related to the publication of product safety restrictions for dangerous and toxic substances that are pesticides.

Figure 12:
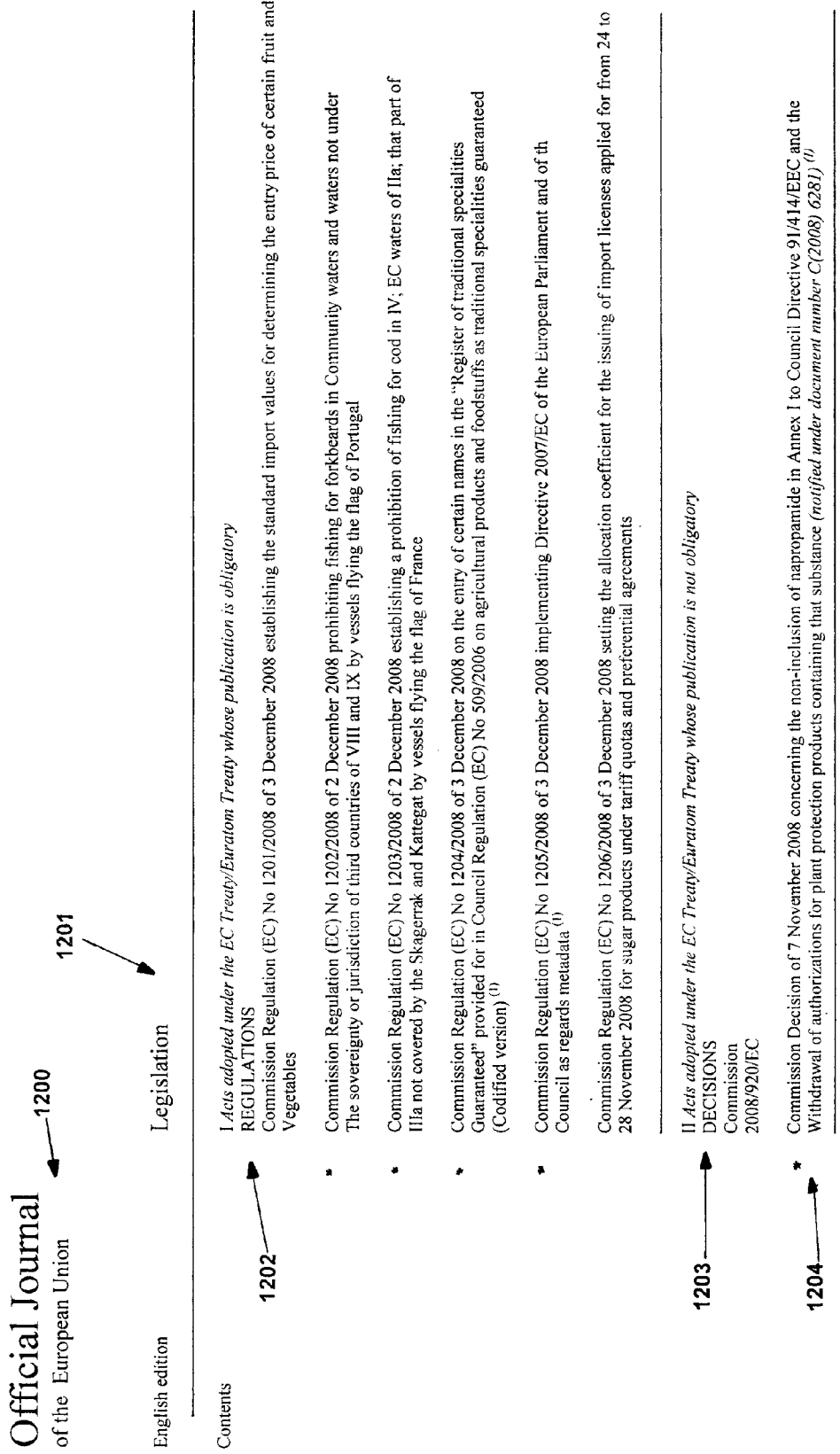
FIG. 12 is an example illustration of a publication associated with a significant control event.

FIG. 12 illustrates an example of an electronic publication found on a governmental web-site source to be investigated by the Master Control Program 102. In particular, the European Union publishes its *Official Journal* on a daily basis and is reviewed by many thousands of users on a daily basis to find out whether an important action has been made. In this instance, the web-site of the European Union can have many different publications that change daily, and further, the *Official Journal* may publish legislation 1201, regulations 1202, and decisions 1203. In order for the Classifier 103 to perform its function, the Master Control program 102 must analyze the various publications available on the web-site and determine whether the publication is new and whether it is relevant to classification, for example, by distinguishing the type of action if possible from legislation, regulations, decisions, and notices.

Figure 13:
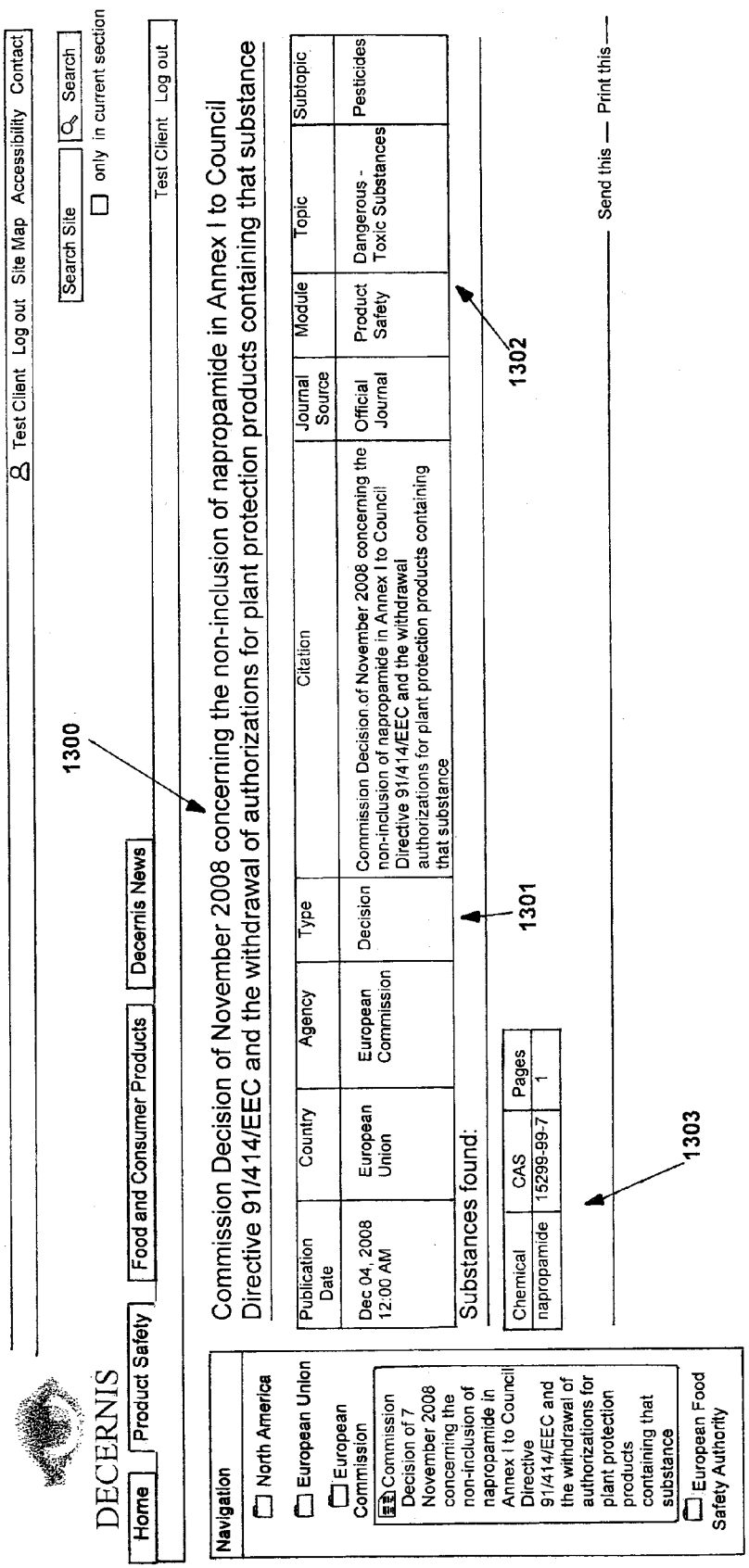
FIG. 13 is an example user screen illustrating a control event and an associated publication in an embodiment of the present invention.

In the noted instance illustrated by FIG. 13, the European Union has published a decision: "Commission Decision of 7 Nov. 2008 concerning the non-inclusion of napropamide in Annex I to Council Directive 91/414/EEC and the withdrawal of authorisations for plant protection products containing that substance" 2008/902/EC. Indeed, this is a significant control event because among other measures, the Commission has decided that Member States of the EU must ensure that no authorizations for plant protection products containing napropamide may be granted or renewed from the date of the decision. It also establishes a schedule for the withdrawal of authorizations for pesticides containing napropamide. Any manufacturer, distributor, governmental official, and member of the public concerned with these products would want to be informed as soon as possible of this action. However, referring to FIG. 15, a search a day following publication in major search engine, Google™, illustrates that even a narrow search for "napropamide European Union" returns a large number of document (896) and does not rank this publication highly. As a result, it would be a publication easily missed even by a user employing very narrow search terms. In contrast, this publication was identified by the present invention the same day.

In an example of an embodiment of the present invention, once the Master Control Program 102 discovers by the running of the application on the computer server accessing a web site source, received document, or data stream that the EU decision is a new publication and has categorized its control type, i.e., that it is a "decision", the publication is passed to the Classifier application running on a computer 103. One embodiment of the running of the Classifier application is illustrated in FIG. 16. The database field key reference to the EU decision passed by the Master Control Program is "dec_2008_902_2.txt" 1600. The control category event database key code identified by the Classifier is then provided 1601. In this case, the database key associated with the control event for product safety restrictions for dangerous and toxic substances that are pesticides is "245". The use of standard control codes makes it possible in one embodiment of the present invention to pass control events in different languages as standard phrases that may be translated into many languages. In the particular method of analysis selected and illustrated in FIG. 16, a number of possible categories 1601 were evaluated by the Classifier application for this publication, "165", "260", "142", etc. However, it can be seen that there are many occurrences found that correspond to control event "245". Although the classification method in this case is a statistical one based on word frequencies in a publication, there are a number of alternative methods that may be used, as indicated. The output of the Classifier is illustrated in FIG. 17 and the classification step discovers a control event "245" for this publication, product safety restrictions for dangerous and toxic substances that are pesticides and the type of the control event discovered by the Master Control Program is a decision of the European Commission.

A preferred embodiment of the present invention includes a separate classification step in which a product, substance, food or foodstuff, biological agent, disease, and commodity is indexed within the publication by one or more methods. A further embodiment indexes any broad concept and commercial information within the publication. Such indexing includes references and identification system in common use by supply chains, for example, GS1 Global Registry® and other data synchronization networks that are designed to facilitation of communication by trading partners. Further, indexing can be associated with particular shipments of a particular product to facilitate tracking, traceability and product recalls in relation to a control event that might apply to particular shipments. To do so permits the user to relate a control event applicable to a component part to an article or which is important to the user in some way, for example, in the consideration of alternative products and ingredients. In this case, the indexing step for the separate classification discovers that the substance referred to by the EU has the CAS RN of "15299-99-7" using a common identifier for chemical substances. As a result of this identification, it becomes possible for the user of information system to use other methods of identification that permit the user to search for and obtain the publication of interest. Associated terms may not be simply identifiers; they may also be translations into another language or synonymous references. Such synonyms and translated terms in this case include:

a. 15299-99-7 2-(α-naphthoxy)-n,n-diethylpropionamide
b. 15299-99-7 N,N-Diaethyl-2-(α-naphthoxy)-propionamid
c. 15299-99-7 N,N-Diethyl-2-(1-naphthalenyloxy)propionamide
d. 15299-99-7 Napropamid
e. 15299-99-7 Napropamida
f. 15299-99-7 Napropamide
g. 15299-99-7 Napropamide, N,N-diethyl-2-(1-naphthyloxy) propionamide
h. 15299-99-7 Propanamide, N,N-diethyl-2-(1-naphthalenyloxy)

An illustration of one embodiment of this separate classification step is illustrated in FIG. 13. By including this separate classification step, a number of customized and value-added services 1303 can be provided that include but are not limited to: a) An identification of the manufacturers and distributors affected can be provided by a linked search using the identifier, b) a listing of the user's products that contain the substance as an ingredient, c) other functional or transaction control steps can be invoked based on this early alert to the publication of a control event, such as whether a product recall is to be issued and whether management is to be informed, d) an information signal passed to a supply chain management service and data network, and e) an information signal passed into an enterprise system, such as that illustrated in FIG. 10.

The output of the Classifier application 103 is passed to the Content Management System 104, and for the example, above, this is illustrated in FIG. 13. The citation is provided 1300 and the type of control event discovered by the Master Control Program is a "decision" 1301. The English language version of the standard control event is illustrated at 1302.

In this example, the discovery of a significant publication has been illustrated by one embodiment of the present invention. This example also illustrates the limitations of present searching methods and clipping information services that are improved by the use of the present invention to optimize the possibilities that the user will learn of a control event represented by a publication that can be associated with a critical control point in the production of a good or service. Further, the customized services that become possible on the basis of the present invention add value to and improve the quality of control processes of the user.

Figure 6:
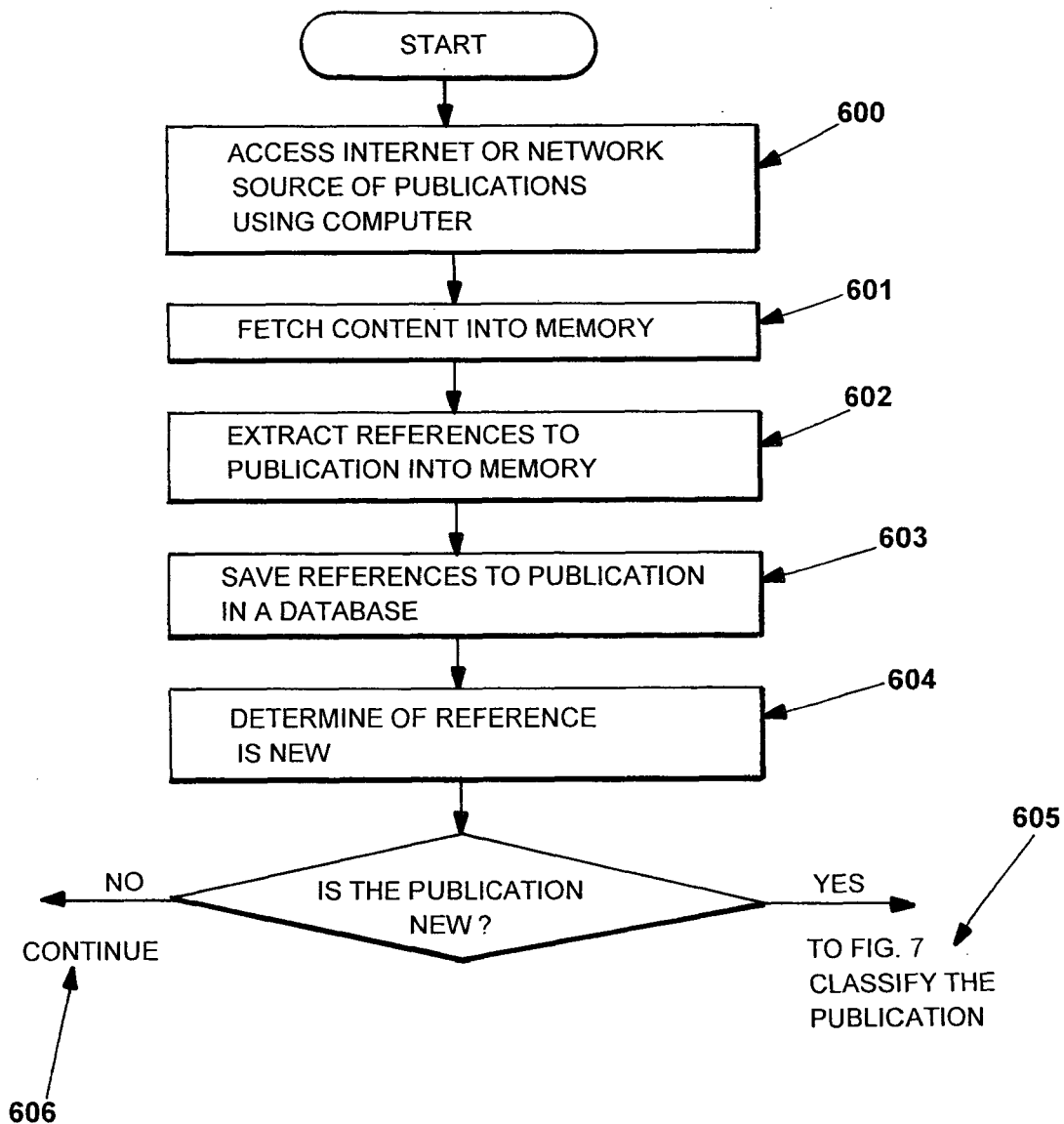
FIG. 6 is an example illustration of the master control program steps in accordance with an embodiment of the present invention.

The Master Control Program 102 carries out a series of steps illustrated in FIG. 6. For each source of publications, electronic documents or stream of data contained in the database of sources 105, the first step is to access the source that may be accomplished by but is not limited to the following: A query, web-site, network node, a web-service request, an automatic procedure interface (API), a remote procedure call (RPC) or a file 600. Information is fetched from the source 601 into the memory of the computer apparatus. At this point, the Master Control Program extracts references to any publications, data, or electronic documents found in the information 602. These references are saved together with any extracted descriptive information, such as title, source, and date. A determination is then made whether the reference to the publication extracted from the downloaded information is already contained in the Database of Publication References 106. If the publication reference is new it is submitted to the Classifier 103. If not, the Master Control Program continues to the next publication, data, or document reference. In addition, the Master Control Program determines the source and the type of the publication, which may include but not be limited to: whether it is legislation, regulation, or a notice and whether proposed or final.

Figure 7:
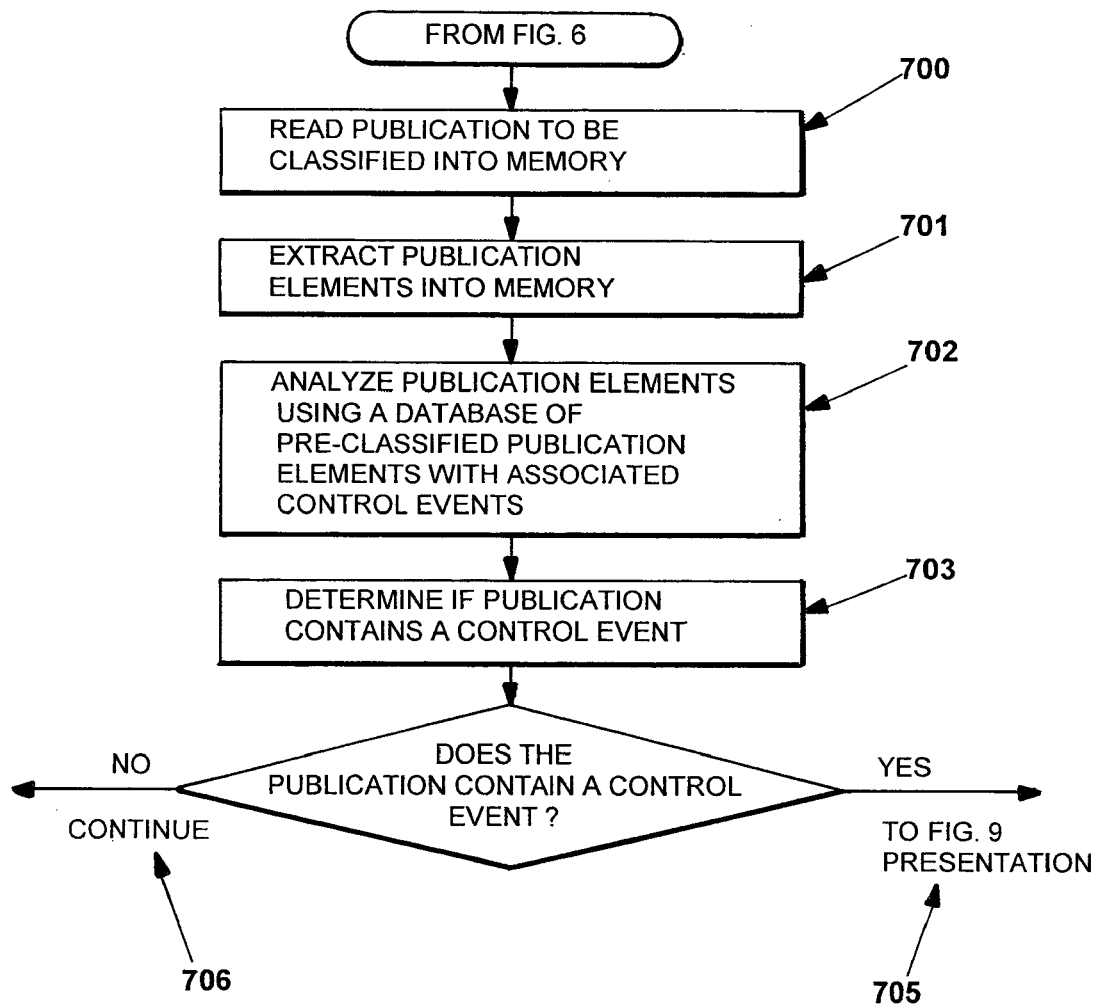
FIG. 7 is an example illustration of the classification steps to discover control events within a publication in accordance with an embodiment of the present invention.

The classification step is illustrated in FIG. 7. The classification begins with the reading of the publication into the memory of the computer 700. The elements of the publication are extracted 701. As indicated, the elements used in the classification step of a publication may include but are not limited to include word terms, fragments, URL references, phrases, spatial or formatted document sections, and images. The elements extracted are related to one of a plurality of possible classification methods. An analysis 702 of the publication then occurs to find elements within the publication that match a database of pre-classified elements that are associated with control events. For example, if the method of classification used is an Inverse Term Frequency, then the elements extracted are words and the database contains the weighted scores to be used in the classification analysis based on the frequency of occurrence of each such word found in the publication. The analysis within the application running on the computer apparatus produces a conclusion that the publication is or is not classified as one containing a control event 703. If the conclusion from the application is that a control event exists, it is passed to the content management system. If not, the application continues with the next publication to classify until an end to the queue of publications or until stopped.

Figure 8:
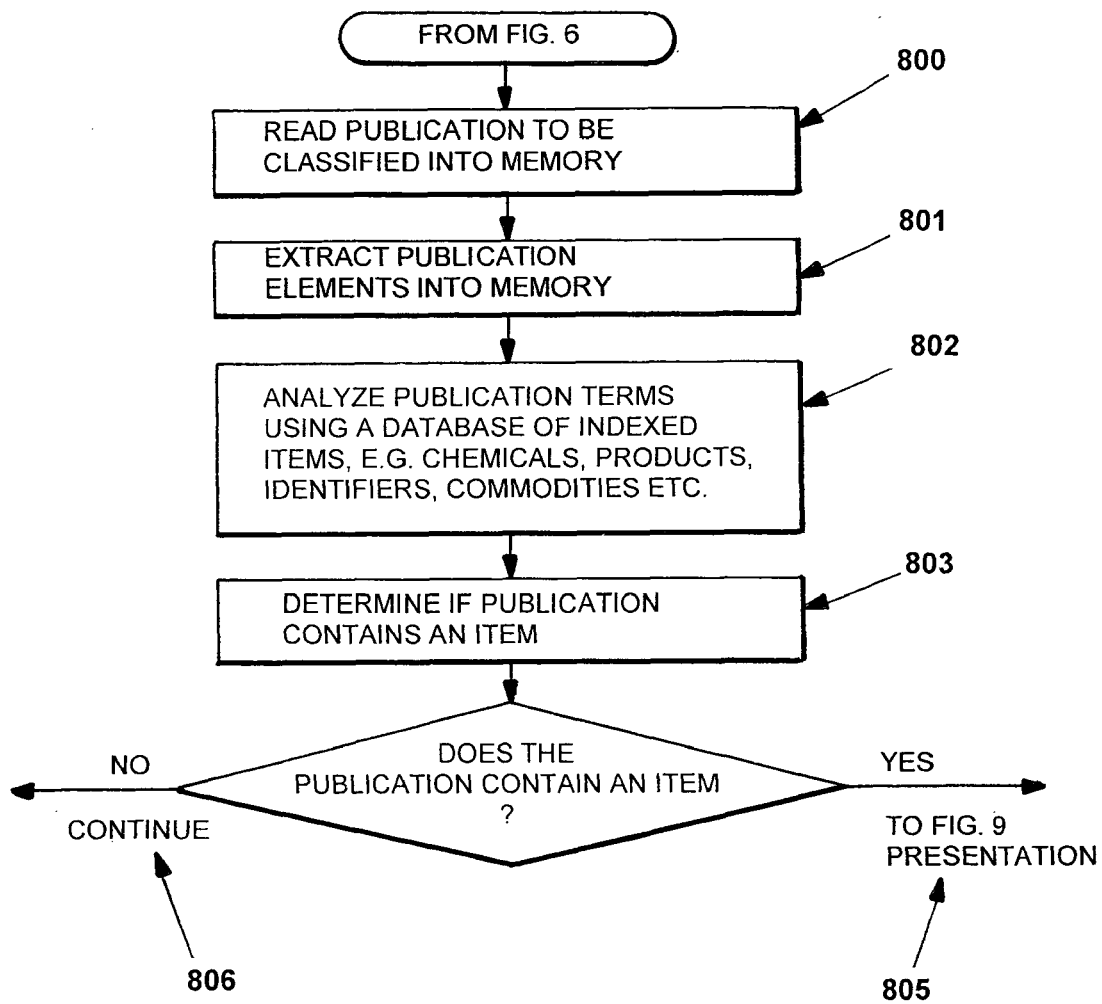
FIG. 8 is an example illustration of a preferred embodiment of the present invention where the classification steps are to discover items within a publication.

Referring to FIG. 8, in a preferred embodiment of the invention, another classification is made by an application running on the computer apparatus in order to identify whether the publication contains an item of interest. As used in this invention, an item may be a chemical, product, product identifier, biological agent, commodity, disease, citation, defined risk, hazard, user-defined issue, transaction code, RFID code, institute, governmental agency, manufacturer, processor, and distributor. In order to classify the publication, data stream, or electronic document whether it contains an item of interest, it is received and read into the memory of the computer running the application 800. The elements of the publication, data stream, and electronic document are extracted and parsed 802. The elements are compared against an indexed database of items. This comparison may be accomplished in one of a plurality of methods, which include but are not limited to a simple look-up of a candidate item in a database of known items and an analysis using an algorithm to discover an item. For example, if the search is for a chemical item and the selected method of analysis is using word fragments, then an inverted index using the longest terms first can be used to successfully identify a chemical item. If the word fragments are "sodium" followed by "chromate" then an inverted index comparing sodium chromate first followed by sodium is necessary to avoid the false classification that the publication contains the items "sodium" and "chromate" when it refers to "sodium chromate". With the method of analysis selected all items are extracted from the publication. The application running the classification makes a determination based on the method of analysis selected that the publication contains an item 803. If the conclusion from the application is that an item exists within the publication, it is passed to the content management system. If not, the application continues with the next publication to classify until an end to the queue of publications or until stopped.

Classification of items permits a user of the information service can receive an alert that a control event has occurred in the first classification step and that it applies to an item being produced, manufactured, or otherwise of interest in the second classification step. For example, FIG. 3 illustrates the discovery, using the classification methods described, of a control event 300, which is that the European Chemicals Agency has received a nomination to list a chemical under REACH Annex XV, which is a process in the European Union for registration and evaluation of chemicals and that this represents a control event described within the control categories of Product Safety, Dangerous and Toxic Substances, and the sub-category, REACH 302. Referring to FIG. 4, which is a detailed view of the control event, a list of items is illustrated which come from the item classification step. In this example, the items are chemicals. "Coal tar pitch" with an identifier is listed 400. FIG. 5 illustrates the display of the publication based on the click of a hyperlink, which is available as part of the publication attributes extracted and provided to the content management system. In this case, "coal tar pitch" has indeed been nominated by the European Union as a chemical of significant or very high concern under REACH but that the identifier given is an "EC number", which may not be readily available to some users. In the preferred embodiment the items classified within the publication are associated with identifiers that may be used within the user's local business process or in a supply chain information service. There are many such standard identifiers and a customized information service based on the invention would provide the facility to associate such an item with a user-defined identifier and with any product, good, service, and process to which the item belongs. For example, a customized information service would map the standard identifiers available in the database to the user's identifiers that might include but are not limited to: Part numbers, product codes for products containing the item as a component or raw material, supplier or customer information, and RFID or other bar-codes codes associated with an individual shipment.

Figure 9:
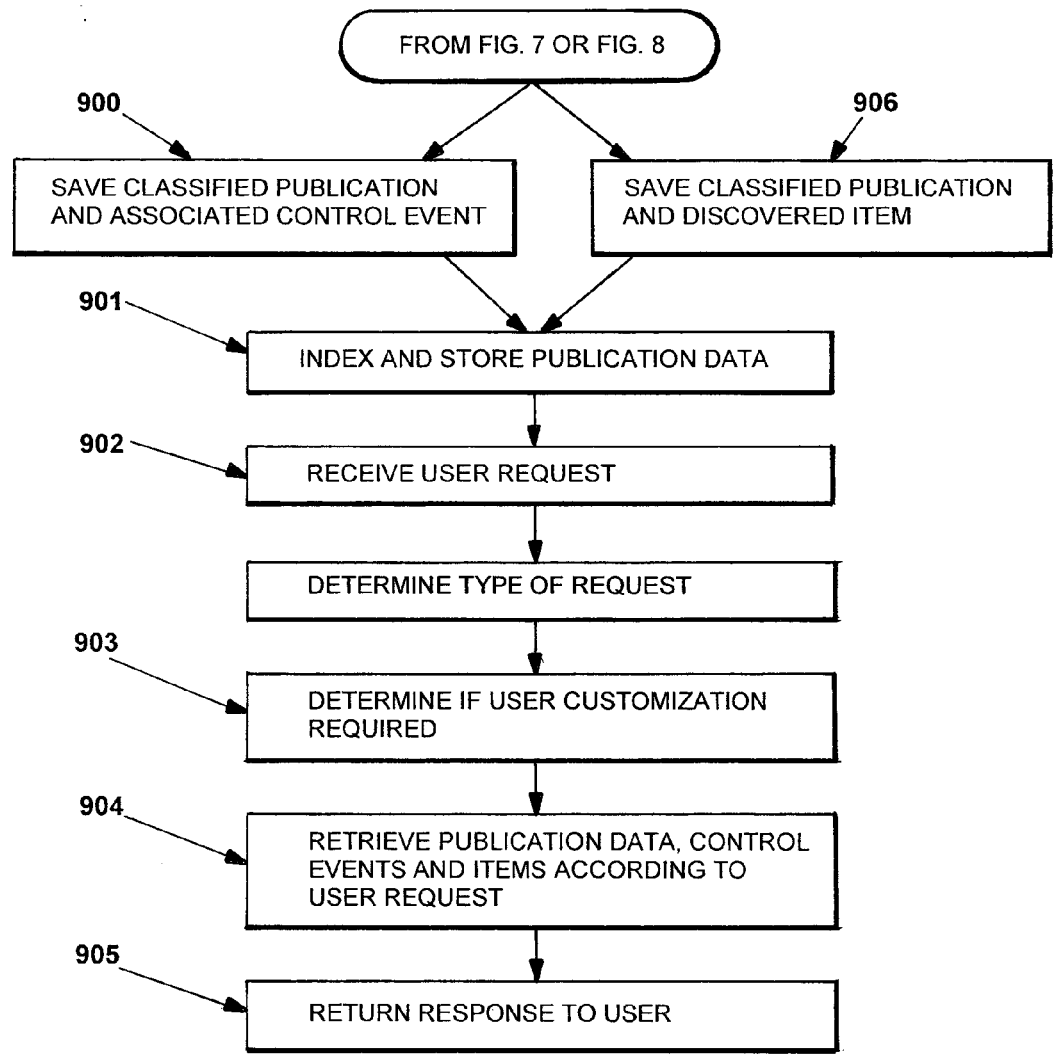
FIG. 9 is an example illustration of the content management system steps in accordance with an embodiment of the present invention.
Figure 10:
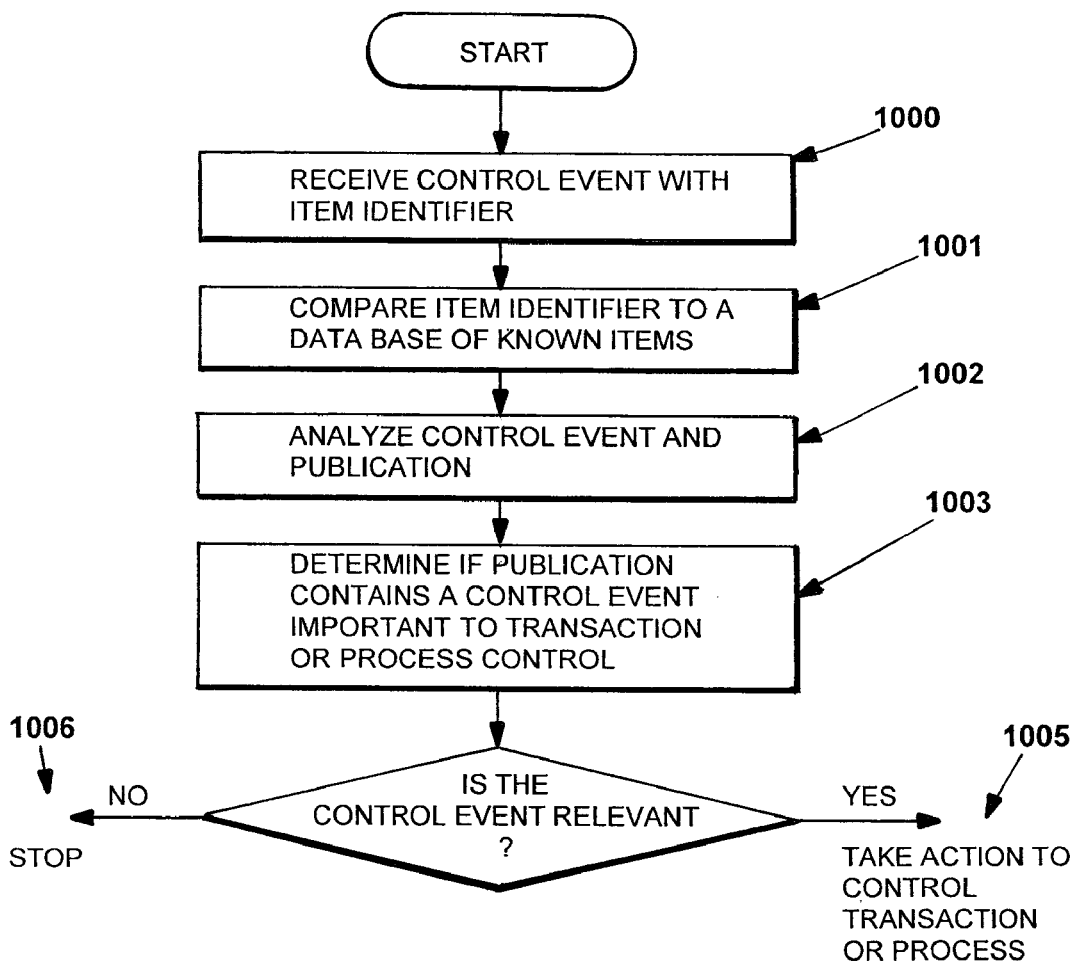
FIG. 10 is an example illustration of a user receiving system for a transmitted control event in a business-to-business exchange with an embodiment of the present invention.

Referring the FIG. 9, the classified publications are provided from the previous classification to a content management system running as an application on a computer 104. The classification may be of a control event 900 and in the preferred embodiment, a classification of items 906. The information passed by the classification step is indexed and stored 901. A user request may then be received 902. A user may be but is not limited to: a human being accessing the information service via a personal computer over the Internet, Intranet, or other network; a business-to-business request from another system using a query, remote procedure call (RPC), web-service request, or the passage of structured content, for example, through a protocol such as XML; and another information service, information aggregator, and supply chain information service. The type of request received and any authorization necessary is then carried out 902. In one embodiment of the present apparatus and method, the user creates a customized information service by requesting that any response be filtered according to a defined set of parameters provided by the information service. For example, the information service could permit customization by allowing the user to select particular control events and items of interest. The content management system responds with the information stored about the control event discovered and references to the publication 904 and returns a response to the user 905.

Where the user is another system in a business-to-business exchange, the control event must be consumed by the user system through a receiving step, an example of which is illustrated in FIG. 10. Many such receiving steps are possible and the illustration refers to only one embodiment. The control event and any associated items with available identifiers are received by the user system 1000. This is equivalent to a motor receiving a signal over a network, but in this case it is a system that is part of a business or manufacturing process receiving a control event. The identifier given, which may be but is not limited to a part number, product code, CAS registry number, EC number, shipment number, risk, hazard, user-defined condition, and citation. The user's system analyzes the identifiers and control event codes given against one or more databases containing the user's identifiers and control event codes. The control codes may be provided as standard phrases that are part of a standard library of control events in order to provide consistency of information and use by the user and any actor in a supply chain for a good or service. The user system then determines whether the control event or the identifier is of interest by manual or systematic means. If the control event is associated with an item of interest the user takes action to control a transaction or process 1005. If not, the user's process stops or waits for the next received signal 1006.

A further embodiment of a compliance management system includes a database system and hardware apparatus that includes a composition management system and hardware apparatus to store the product-component-raw material information, a database management system and hardware apparatus to collect the trend information, a series of trend analysis functions, and an output device. The output device may be connected to a network and service application to distribute, search, and display trends personalized to the requirements of the user. In another embodiment, the trend analyses are distributed as a service to participants of a network and supply chain.

Figure 18:
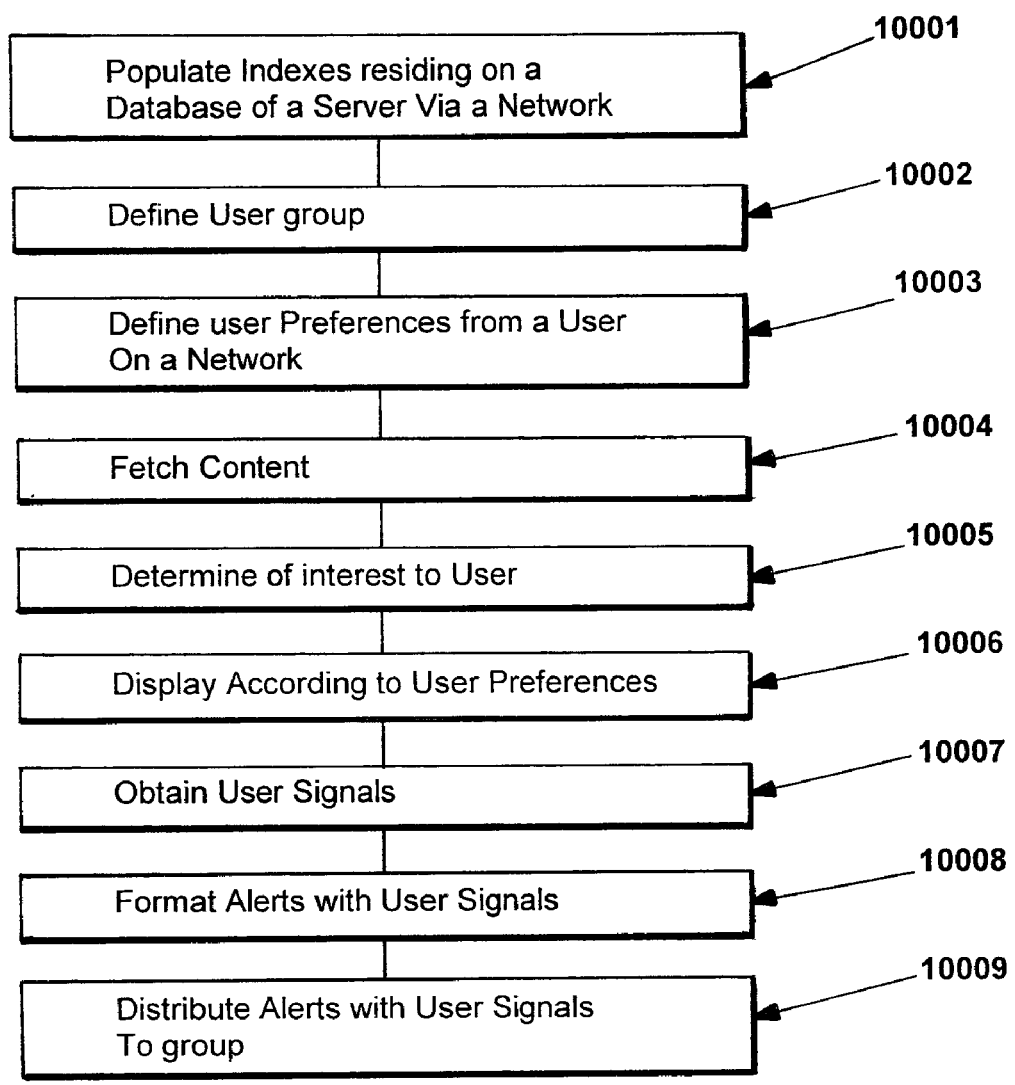
FIG. 18 is a flowchart of a method in accordance with another embodiment of the present invention.

Embodiments of the present invention allow the user and the user's management more effective ways of collaboration in a complex, dynamic global market place and in visualizing trends of immediate importance that are relevant to control decisions of the business or process. Referring to FIG. 18, the steps of the method and system of a further embodiment of the compliance management system are illustrated. In step 10001, the index database is populated by one or more means of automatic methods well known in the art, which may include statistical or content analyses in addition to the manual loading of content. In step 10002 a user group with members and preferences are identified within the database. In steps 10003 and 10004 the system fetches the available content separately received and processed by the system, and determined which of the fetched content may be of interest to a user based on the user's preferences. The relevant content is displayed for the user in step 10005. The user in step 10006 may then review the displayed content, identify the materials for which further dissemination in the group is desired and in step 10007 send a signal back to the system. In step 10008 the system prepares alerts for group members based on the signals received from the user, and distributes the alerts to the group members (step 10009).

Figure 19:
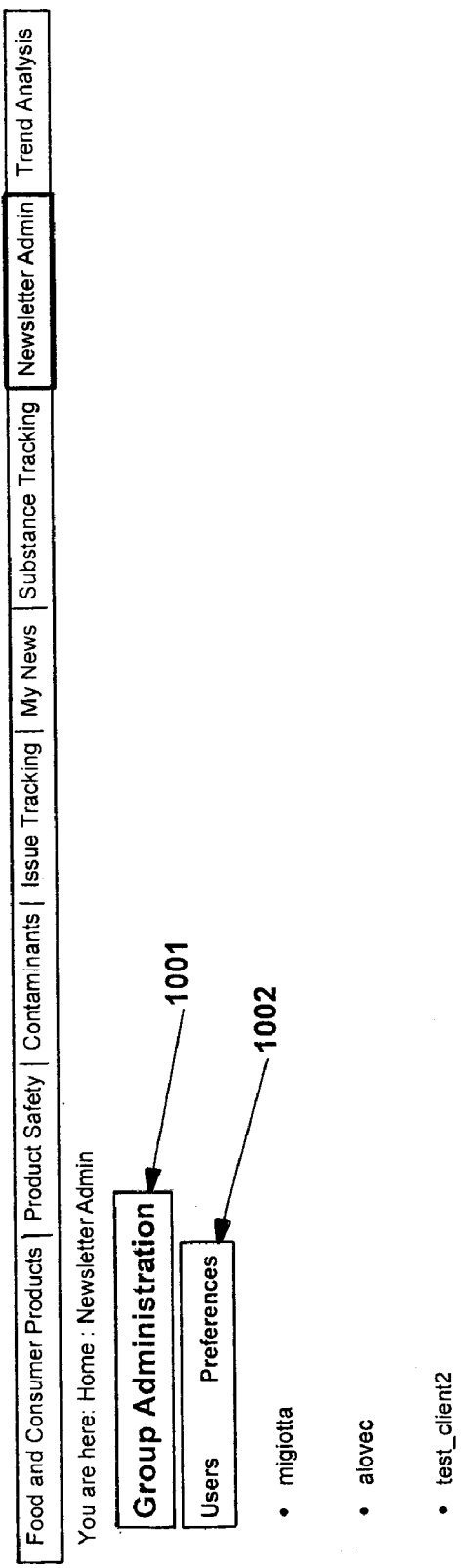
FIG. 19 is a computer screen view of a user group definition function usable with an embodiment of the present invention.

FIGS. 19-20 illustrate how a number of scientific and regulatory experts of a group might be organized according to an organizational plan for dividing the work of tracking emerging risks on a global basis. Within the Group administration 1001, each user member will have preferences 1002 established according to the management plan so that each person's responsibility represents coverage of a necessary part of all potential issues of concern. As shown in FIG. 20, the user may select the preferences to personalize the alerting of dynamic news events that would be relevant to the control of the business process, in this instance selection of geographical coverage and topic in selection boxes 1010. The organization plan may have preferences organized by geography, function or some other approach to division of responsibility. The preferences may include the types of information to be received. For example, senior management may not find it useful to receive alerts for all news, but only those issues that have been reviewed by a subordinate team. The preferences define the service levels for the organization, of the type, filtering, and formatting of the information to be distributed.

In another embodiment of the invention, the recipient of content from the alert service may be another system rather than, or in addition to, a human member of the group, and therefore the alert information being forwarded should be provided in a manner that may be received by such a system. Such systems include enterprise systems enabling an alert related to particular products stored in a database, cell phones, email systems, optical readers, etc.

FIG. 21 illustrates an embodiment in which the user may identify specific substances and commodities of interest. This information may be presented for selection ins various ways, such as by the names of the substances may be given as shown in box 1020, or by a substance's identifying number such as a Chemical Abstracts Registry number as shown in box 1021. Many such identifiers may be considered including raw material identification numbers or part or product numbers. The identification of substances may be manual or directly linked to a composition database in such a manner that the alert service may track substances, commodities, hazards, or other issues stored in the enterprise system.

The results of the determination of content of interest to the user employing a substance tracking filter are illustrated in FIG. 22. In this embodiment the alerts that result from a user's preferences is illustrated in FIG. 22 in listing 1030. In this listing, all news stories concerning the pesticide paraquat, based on the user's preference selection in box 1020 in FIG. 21, are provided. The user interface here is also provided with additional functionality to section, parse, or filter the alert's listing. One of the innovative aspects here is that the news story may be in any language or refer to paraquat by any synonym, with the present invention's automatic functions having filtered and organized the content based on a broad number of variations for identification of the substance (without the user being required to identify and specify all such variations) and deposited the relevant references in the index database, whereupon the indexed data is queried and displayed according to the preferences established by the user, as in list 1030. Further, this concept may be extended to the group's management assignment groups of substances and commodities to individual experts or managers for routine monitoring. In this way, a manufacturer might assign the products, components, and raw materials of one division for review by the central service as assigned to one user, and the materials of importance to another division to another user.

In a further embodiment of the invention, important items may be specifically identified for review and response as, for example, emergent or urgent issues. For example, FIG. 23 depicts in listing 1040 a user's display of an article identified as having been issued by the Center for Disease Control dealing with a published report on the lack of progress in controlling Salmonella, the display of which resulting from a user's preferences. If the user wishes to identify this event of importance to the group, then by a click or other action the event may be highlighted on the user's listing and thereby identified to the system to forward an alert to the group. As a result, all the users to whom this event may be important are immediately alerted to this event. Further filters and preferences may be established to further refine the alert distribution, for example so that other users in the group are alerted to the event only if the event is relevant to the scope of an individual group member's responsibilities. In this manner, the invention is similar to the function of different processors in a modern car, in which each processor performs its own function and may send signals to others on a network, and each processor listens only to the signals addressed to or relevant to its process. Here, using the system and method of the present invention, experts may work more effectively together and respond more quickly to dynamic events which require immediate evaluation and response in the course of control of a business process.

Figure 24:
FIG. 24 is a computer screen view of a first screen of a trend analysis visualization program in accordance with an embodiment of the present invention.
Figure 28:
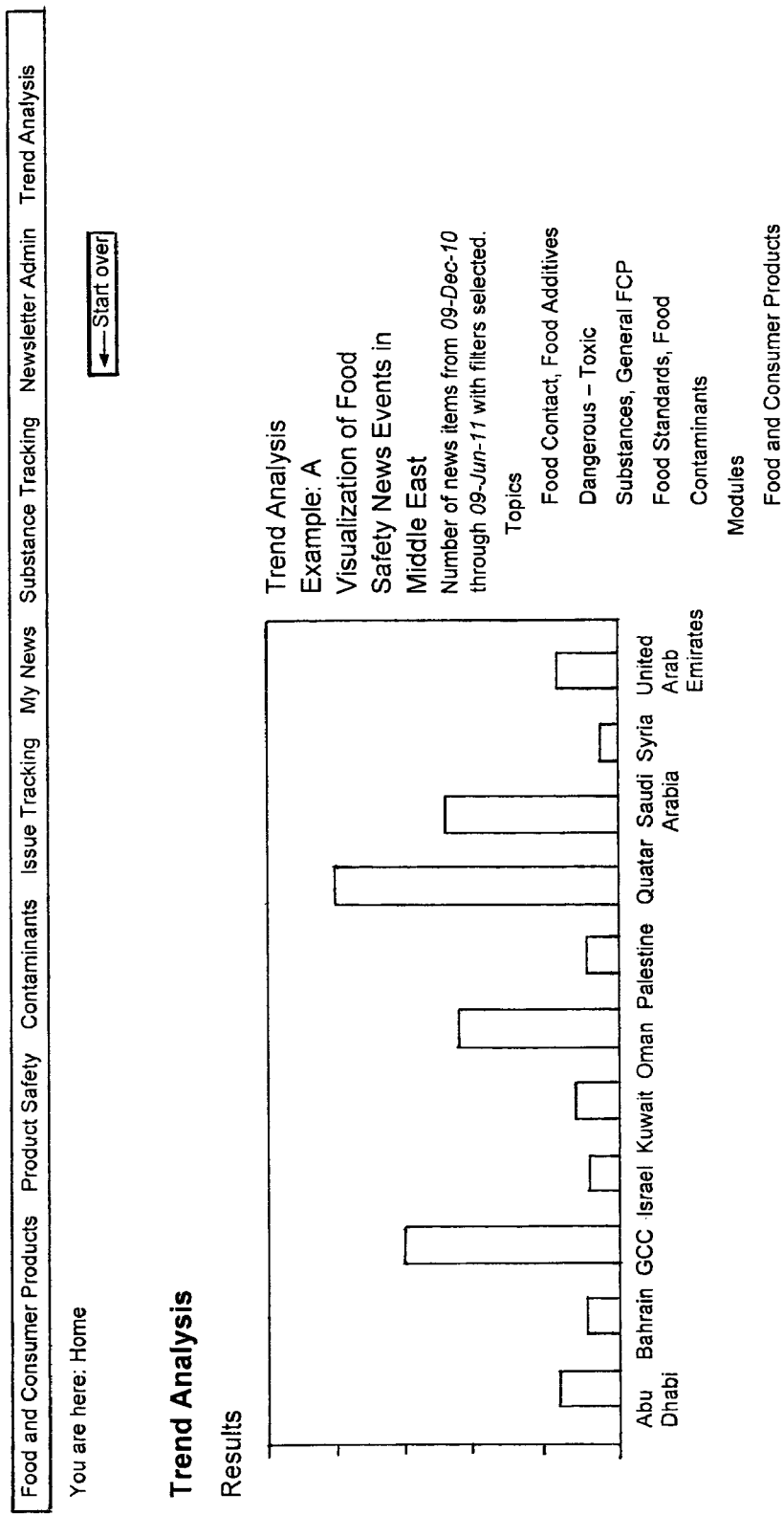
FIG. 28 is a computer screen view of a trend analysis visualization presentation in accordance with an embodiment of the present invention.

The management of a business process is often greatly aided by the visualization of trends. The present invention provides a system and method for the visualization of news events and issues of importance to a process. FIGS. 24-28 illustrate a process visualization of events in one embodiment of the invention in, as shown in FIG. 24, a user selects a style of bar chart to create and specifies a visualization of trends in food safety events (in this case, as depicted in box 1060, food events in the Middle East). The user may next select a time period for the analysis, as shown in box 1070 of FIG. 25, followed by selection of the geographic area in box 1080 in FIG. 26. The trend analysis may also use or allow for different filters, such as the topic filters shown in FIG. 27 in box 1090. The result of the trend analysis prepared by the system in response to the user's selections in this example is shown in the bar chart 1101 of FIG. 28.

Based on a structured analysis of control events, many such visualizations and analyses may be designed, allowing the analysis of dynamic events relevant to a process in a variety of views. For example, the analysis may be a review of the substances and raw materials used in a manufacturing process, in order to determine whether any of the substances or raw materials are becoming of increasing concern to the point of warranting further management action. In this way the present invention may allow manufacturers to avoid the use of substances of concern at the earliest possible stage, for example, permitting early avoidance of food colors that might be associated with hyperactivity. Other visualization focuses may include analyses of specific topics or regions, risks, hazards, or particular production processes, suppliers or customers, or the development of trends important to brand assets over time.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for process-wide analysis and distribution of control events discovered from at least one of electronically published documents and electronic data, comprising:

populating a user group database with a plurality of users in a group associated with at least one of a product manufacturing, review, distribution, transport and inspection process;

populating a user interest database with at least one of geographic and subject matter identifiers associated with interests of at least one user of electronically published documents and electronic data in the group;

accessing the at least one of electronically published documents and electronic data stored on a plurality of network servers;

operating a control program on a computer to identify at least one of the electronically published documents and electronic data stored in the plurality of network servers which potentially contain control events, wherein the control program identifies at least one of the electronically published documents and the electronic data which potentially contain control events by reference to the user interest database;

storing a copy of the at least one of identified electronically published documents and electronic data potentially containing control events in a local storage device accessible by a classification program operating on the computer;

providing a control event database of classified control events associated with the control of at least one of goods and services;

operating the classification program to determine whether control events are present in the stored documents potentially containing control events, wherein the classification program determines whether at least one discovered control event is present by reference to the control event database;

assigning at least one control event classification to the stored documents determined to contain the at least one discovered control event;

storing the assigned control event classification and information identifying the stored electronically published document or electronic data containing the at least one discovered control event in a classification database;

displaying at least one of the electronically published documents and electronic data containing the control event to the at least one user, wherein the display is created by reference to the user interest database and the stored assigned control event classification, and the display includes at least one link to at least one of the stored control event classification and the at least one of it electronically published document and electronic data;

receiving the at least one user's designation of at least one control event as an alert of potential interest to at least one other member of the group; and forwarding a notification of the alert to the at least one other member of the group.

2. The method of claim 1, wherein
the control program identifies at least one of documents and data which potentially contain control events by at least one of examination of document text, data received, examination of document publication dates, and application of a publication and data selection algorithm using at least one of predetermined document and predetermined data selection criteria.

3. The method of claim 1, wherein
the classification program determines whether control events are present in the at least one of stored documents and data by at least one of Bayesian Analysis, Inverse Term Frequency Analysis, and a statistical classification method which evaluates the cumulative frequency of terms identified using a weighted scoring based on a predetermined set of words and phrases associated with control events.

4. The method of claim 1, wherein
the database of classified control events relevant to the control of at least one of goods and services includes classified control events pertaining to discovery of at least one of a chemical, biological agent, disease, food, food ingredient, material, product, risk, hazard, supplier, customer, organization, and service control event.

5. The method of claim 1, wherein
the classification program determination of whether control events are present is multi-lingual.

6. The method of claim 1, wherein
at least one of the database of classified control events and the control event classification includes user-defined control events corresponding to a scope of control events of interest of at least one individual user, and
reports forwarded to the at least one individual user contain only information on discovered control events and at least one of electronically published documents and electronic data within the scope of control events of interest of the at least one individual user.

7. The method of claim 6, wherein
at least one of the at least one individual user is a producer of a good or service, and
producer's enterprise control application is programmed to permit the producer to customize a presentation of received information about control events and the at least one of discovered documents and discovered data associated with the producer's individual products and processes.

8. The method of claim 1, wherein
reports of discovery of the at least one of documents and data containing control events are transmitted to a client enterprise control application which receives the reports and integrates information in the reports into an information management system of at least one user.

9. The method of claim 1, further comprising:
automatically generating and storing an index and a summary of the one or more electronically published documents and electronic data containing at least one discovered control event.

10. The method of claim 1, further comprising:
searching in response to a request from the at least one user for any discovered control event associated with chemical, biological agent, disease, food, food ingredient, material, product, supplier, customer, organization, risk, hazard, and service within a scope of interest of the at least one user.

11. The method of claim 10, wherein
the search is conducted using at least one of a synonym, translation or aggregated concept related to the control event.

12. An apparatus for discovery of information containing control events from at least one of electronically published documents and electronic data, the apparatus comprising:
a user group database on a computer-readable storage medium with a plurality of users in a group associated with at least one of a product manufacturing, review, distribution, transport and inspection process;
a user interest database on a computer-readable storage medium populated with at least one of geographic and subject matter identifiers associated with interests of at least one user in the group;
a control program on a computer-readable storage medium, the control program comprising computer code for identifying one of electronically published documents and electronic data elements stored in a plurality of network servers which potentially contain control events, wherein the control program identifies at least one of the electronically published documents and electronic data elements which potentially contain control events by reference to the user interest database;
an electronically published document storage device, the storage device being arranged to store a copy of identified at least one of the electronically published documents and electronic data elements potentially containing control events;
a control event database on a computer-readable storage medium containing classified control events associated with the control of at least one of goods and services;

a classification program on a computer-readable storage medium, the classification program comprising computer code for discovering whether control events are present in the stored at least one of the electronically published documents and electronic data elements potentially containing control events and assigning at least one control event classification to the stored at least one of the electronically published documents and electronic data elements determined to contain at least one discovered control event, wherein the classification program determines whether the at least one control event is present by reference to the control event database;

a storing program on a computer-readable storage medium, the storing program comprising computer code for storing the assigned control event classification and information concerning the determined at least one of the electronically published documents and electronic data elements containing the at least one discovered control event;

a discovered document and data element reporting program on a computer-readable storage medium, the discovered document and data element reporting program comprising computer code for creating a report of discovery of the identified at least one of the electronically published documents and electronic data elements containing control events to the at least one user and delivering the report to the at least one user, wherein the report is created by reference to the user interest database and the stored assigned control event classification, and the report includes at least one link to the stored assigned control event classification and its associated document or data element;

an alert distribution processing program on a computer-readable storage medium, the alert distribution processing program comprising computer code for receiving the at least one user's designation of at least one control event as an alert of potential interest to at least one other member of the user group and forwarding a notification of the alert to the at least one other member of the user group.

13. The apparatus of claim 12, wherein
the control program identifies the at least one of electronically published documents and electronic data elements which potentially contain control events by at least one of examination of document text, data received, examination of document publication dates, and application of a publication and data selection algorithm using predetermined document and data selection criteria.

14. The apparatus of claim 12, wherein the classification program determines whether control events are present in one of the stored electronically published documents and electronic data elements by at least one of Bayesian Analysis, Inverse Term Frequency Analysis, and a statistical classification method which evaluates the cumulative frequency of terms identified using a weighted scoring based on a predetermined set of words and phrases associated with control events.

15. The apparatus of claim 12, wherein
the database of classified control events relevant to the control of at least one of goods and services includes classified control events pertaining to discovery of at least one of a chemical, biological agent, disease, food, food ingredient, material, product, risk, hazard, supplier, customer, organization, and service control event.

16. The apparatus of claim 12, wherein
the classification program determination of whether control events are present is multi-lingual.

17. The apparatus of claim 12, wherein
at least one of the database of classified control events and the control event classification includes user-defined control events corresponding to a scope of control events of interest of at least one individual user, and
reports forwarded to the at least one individual user contain only information on discovered control events and one of electronically published documents and electronic data elements within the scope of control events of interest of the at least one individual user.

18. The apparatus of claim 17, wherein at least one of the at least one individual user is a producer of a good or service, the computer system further comprising:
an enterprise control program on a computer-readable storage medium, the enterprise control program comprising computer code for permitting the producer to customize a presentation of received information about control events and discovered documents and data associated with products and processes of the producer.

19. The apparatus of claim 12, further comprising:
an indexing and summary program on a computer-readable storage medium, the indexing and summary program comprising computer code for automatically generating and storing an index and a summary of one or more electronically published documents and electronic data containing at least one discovered control event.

20. The apparatus of claim 12, further comprising:
a search program on a computer-readable storage medium, the search program comprising computer code for searching in response to a request from the at least one user for any discovered control event associated with chemical, biological agent, disease, food, food ingredient, material, product and service within the at least one user's scope of interest.

21. A method for process-wide analysis and distribution of control events discovered from at least one of electronically published documents and electronic data, comprising:
populating a user group database with a plurality of users in a group associated with at least one of a product manufacturing, review, distribution, transport and inspection process;
populating a user interest database with at least one of geographic and subject matter identifiers associated with interests of at least one user of electronically published documents and data in the group;
accessing a storage database containing at least one of identified electronically published documents and electronic data potentially containing control events, wherein the at least one of identified electronically published documents and electronic data potentially containing control events are identified by reference to the user interest database;
the at least one of electronically published documents and electronic data stored on a plurality of network servers;
storing a copy of the at least one of identified electronically published documents and electronic data potentially containing control events in a local storage device accessible by a classification program operating on a computer;
providing a control event database of classified control events associated with the control of at least one of goods and services;
operating the classification program to determine whether control events are present in the stored copy of the electronically published documents or electronic data potentially containing control events, wherein the classification program determines whether a discovered control event is present by reference to the control event database;

assigning at least one control event classification to the stored documents determined to contain at least one discovered control event;

storing the assigned at least one control event classification and information identifying the stored copy of the electronically published documents or electronic data containing at least one discovered control event in a classification database;

making available for display at least one of discovered documents and data containing control events to at least one user, wherein the display is created by reference to the user interest database and the stored assigned control event classifications, and the display includes at least one link to at least one of the stored assigned control event classifications and at least one of the stored copy of the electronically published documents or electronic data;

receiving at least one user's designation of at least one control event as an alert of potential interest to at least one other member of the user group; and forwarding a notification of the alert to the at least one other member of the user group.

22. A method for process-wide analysis and distribution of control events discovered from at least one of electronically published documents and electronic data, comprising:

providing identification of a plurality of users in a group associated with at least one of a product manufacturing, review, distribution, transport and inspection process to a service provider for populating a user group database;

providing at least one of geographic and subject matter identifiers associated with interests of at least one user of electronically published documents and electronic data in the group to the service provider for populating a user interest database;

receiving a display of at least one of discovered documents and data containing control events to at least one user, wherein the display is created by reference to the user interest database and stored assigned control event classifications, and the display includes at least one link to at least one of the stored control event classifications and at least one of the electronically published document and electronic data, the stored assigned control event classifications are based on operation of a control program to identify at least one of electronically published documents and electronic data stored in a plurality of network servers which potentially contain control events, wherein the control program identifies at least one of the electronically published documents and electronic data which potentially contain control events by reference to the user interest database and accessing the at least one of electronically published documents and electronic data, and stores on a plurality of network servers and storing a copy of the at least one of identified documents and data potentially containing control events in a storage device accessible by a classification program operating on a computer, the classification program discovering whether control events are present in stored documents potentially containing control events and assigning control event classification and information identifying the stored electronically published document or electronic data containing at least one discovered control event in a classification database, wherein the classification program determines whether a discovered control event is present by reference to a control event database of classified control events associated with the control of at least one of goods and services and assigns at least one control event classification to the stored electronically published documents or electronic data determined to contain at least one discovered control event, and transmitting at least one user's designation of at least one control event as an alert of potential interest to at least one other member of the user group for forwarding by the service provider to the at least one other member of the user group.

* * * * *